Inventor
KEITH H. WYCOFF
BY
Prangley, Baird, Clayton, Miller & Vogel
Attys.

May 19, 1970 K. H. WYCOFF 3,513,399

TONE CONTROL CIRCUIT

Filed Oct. 17, 1967 11 Sheets-Sheet 3

TONE CONTROL CIRCUIT

Filed Oct. 17, 1967 11 Sheets-Sheet 6

TONE CONTROL CIRCUIT

May 19, 1970 K. H. WYCOFF 3,513,399

TONE CONTROL CIRCUIT

Filed Oct. 17, 1967 11 Sheets-Sheet 9

TONE CONTROL CIRCUIT

Filed Oct. 17, 1967 11 Sheets-Sheet 10

United States Patent Office 3,513,399

Patented May 19, 1970

3,513,399

TONE CONTROL CIRCUIT

Keith H. Wycoff, Lexington, Dawson County, Nebr. 68858

Continuation-in-part of application Ser. No. 350,163, Mar. 9, 1964. This application Oct. 17, 1967, Ser. No. 675,812

Int. Cl. H04b 1/16

U.S. Cl. 325—466 12 Claims

ABSTRACT OF THE DISCLOSURE

There is disclosed an FM radio communication system for use in mobile vehicles, the transmitter including control tone generating systems and the receivers including control tone decoder systems so that a selected one of several receivers may be reached by a transmitter upon demand. The decoder systems employ peaking filters having flat response characteristics so that a control tone of predetermined amplitude always serves to actuate the decoder while signals of the same frequency as the control tone, if part of a complex spectrum, will not in fact actuate the decoder, the decoder weighing a control tone against the total signal or a predetermined fixed reference signal. Falsing is eliminated by utilizing tones spaced at about 3⅓% of the resonant frequency with the band width of the tone filters adjusted to about 4% of the resonant frequency; time delay circuits are also incorporated so that the control tone must be present for a predetermined time before the decoder is actuated. Finally, there are disclosed single tone decoders, two-tone decoders of both the simultaneous and sequential type, three-tone decoders of the simultaneous and sequential type, and multitone decoders.

This application is a continuation-in-part of the copending application Ser. No. 350,163 filed Mar. 9, 1964 for Selective Calling Communication System and Components Thereof.

The present invention relates to communication systems, and particularly to communication systems for selectively transmitting intelligence from a transmitter to at least one selected receiver.

The principles of the present invention are equally applicable to communication systems utilizing transmission by wire lines, transmission by a modulated supersonic signal, transmission by AM radio and transmission by FM radio. However, certain features of the invention are most useful when applied to communication systems utilizing FM radio transmission, and accordingly, for the purposes of illustration the invention will be illustrated as applied to FM radio communication systems, and particularly to mobile FM radio communication systems.

There have been several systems utilized heretofore for selectively calling one or more receivers in a mobile FM radio system, all of which prior systems have exhibited substantial disadvantages in use. One such prior system utilizes a "sub-audible" tone superimposed upon the normal voice modulation, the tone being present during the entire transmission; i.e., the presence of the sub-audible tone maintains the associated receiver being called in the receiving condition, loss of the sub-audible tone causing the receiver to be placed in a non-receiving condition. Such a system presents serious problems due to the difficulty of modulating an FM radio signal at low frequencies. Special filtering is required at the receiver to remove the sub-audible tone from the speech so that it will not interfere therewith, low frequency filters suitable for such service being bulky and expensive. Non-users of the equipment operating on the same channel are inconvenienced in that they must listen to an objectionable rumble in their receiver every time a transmission is made by a user of the sub-audible tone control system.

Another prior tone control system used heretofore is mobile FM radio communication systems utilized an audible tone of higher frequency to alert the intended receiver. Reception of the tone by the intended receiver may, for example, actuate a light, thus signalling the user to manually turn on the receiver. Alternatively, the tone of higher frequency may be applied through the receiver output automatically to actuate the receiver into a receiving condition. This system has certain undesirable features including a substantial time delay which must be waited out while the control tone or tones are being transmitted, and once the receiver has been either manually or automatically turned on, the receiver must be manually reset or turned off at the end of the transmission.

Yet another prior control system has utilized a dialing apparatus which sends a sequence of pulses that operate a series of stepping switches in the receiver. Considerable time delay is involved in the selection process and substantial effort is involved on the part of the operator. The equipment in such systems is also bulky and problems are encountered in attempting to install such equipment in the limited space available in most mobile installations.

Accordingly, it is an important object of the present invention to provide an improved selective calling communication system, and particularly an improved tone controlled communication system for selectively transmitting intelligence from a transmitter to at least one selected receiver.

Yet another object of the present invention is to provide a communication system of the type set forth wherein a carrier signal and a control tone are transmitted by the transmitter to the selected receiver, the simultaneous application of the carrier signal and the control tone to the receiver being necessary to render the receiver operative.

In connection with the foregoing object, it is another object of the invention to provide an improved communication system of the type set forth wherein the receiver once rendered operative remains operative until the removal of the carrier signal therefrom and independently of the removal therefrom of the control tone.

Still another object of the invention is to provide a communication system of the type set forth in which the receiver is actuated into the operating condition thereof by the application thereto and subsequent removal therefrom of a control tone.

In connection with the foregoing object, it is another object of the invention to provide a communication system of the type set forth wherein the receiver is actuated into the operative condition thereof by the application thereto and subsequent removal therefrom of the control tone simultaneously with the application thereto of a carrier signal.

Yet another object of the present invention is to provide an improved receiver for a communication system of the type set forth which is tone controlled and which has no output therefrom except when that particular receiver is being called.

In connection with the foregoing object, another object of the invention is to provide an improved receiver of the type set forth in which the selection process is accomplished by the application of one or more short bursts of tone to the receiver preceding the transmission of intelligence thereto.

A further object of this invention is to provide a selective calling system in which no tones used in selecting the receiver of the system are heard in the output of the receiver.

In connection with the foregoing object, another object of the invention is to provide an improved receiver of the type set forth in which the receiver once rendered operative will continue in the operative condition despite short interruptions of the carrier signal but will be rendered inoperative upon the termination of the carrier signal.

Still another object of the invention is to provide an improved tone control circuit for communications receivers which is fast operating, does not depend upon a fixed duration of tone, and is not subject to false activation by the harmonics of the control tone or by voice signals.

In connection with the foregoing object, it is another object of the invention is to provide a tine control circuit having a substantially constant band with of the control tone versus the signal level of the control tone, the response time of the tone control circuit being short relative to the band width of the control filter, the tone control circuit having a constant time delay regardless of the signal levels of the control tone preceding or during the transmission thereof, the time delay period starting from zero if the control tone is interrupted during activation of the tone control circuit.

Yet another object of the invention is to provide a tone control circuit of the type set forth including a plurality of tone channels, the tone channels operating upon the application thereto and the subsequent removal therefrom of the selected control tone to actuate the next tone channel and finally the output circuit to be controlled thereby.

Further features of the invention pertain to the particular arrangement of the elements of the communication system, the receiver therefor, and the component circuits thereof, whereby the above outlined and additional operating features thereof are attained.

The invention, both as to its organization and method of operation together with further objects and advantages thereof will best be understood by reference to the following specification taken in connection with the accompanying drawings, in which.

Figure 1:
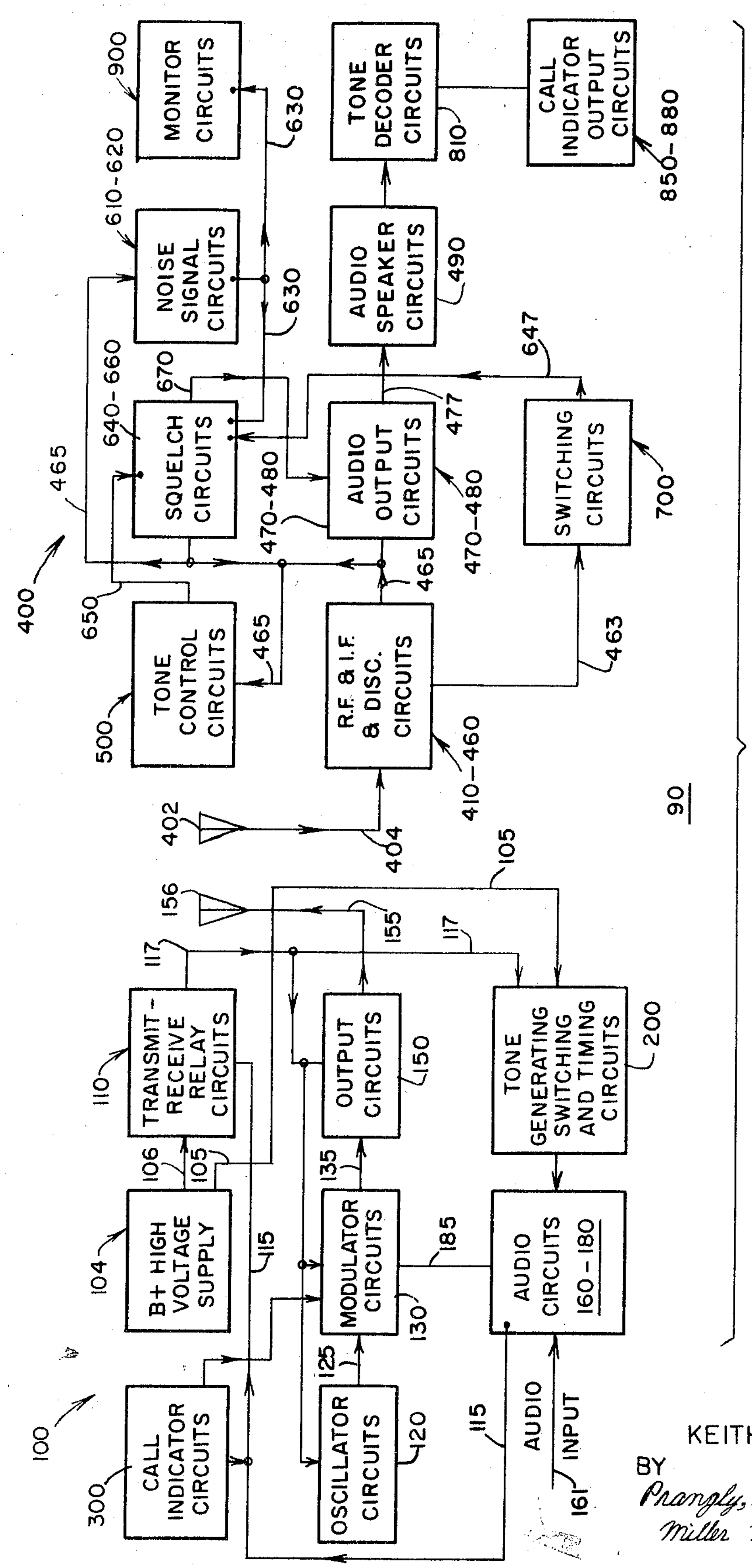
FIG. 1 is a schematic diagram of a communication system made in accordance with and embodying the principles of the present invention, the transmitter and the receiver embodying the system being illustrated in block form.

As has been explained heretofore, the principles of the present invention are equally applicable to communication systems utilizing wire lines, modulated supersonic signals, AM radio signals, and FM radio signals. For the purposes illustrated, there is shown in the drawings a communication system employing FM radio signals. Those skilled in the art will readily understand that the various principles to be described hereinafter in conjunction with systems employing FM radio signals can be readily adapted to the other types of communication systems using other forms of transmission set forth above.

Referring to FIG. 1 of the drawings there is shown a mobile FM radio communication system made in accordance with and embodying the principles of the present invention, the system being generally designated by the numeral 90. The system 90 includes an FM transmitter 100 and an FM receiver 400, it being understood that the transmitter 100 and/or the receiver 400 may be either fixed or mobile, each operating station typically containing both a transmitter 100 and a receiver 400.

The transmitter 100 includes a $B^+$ high voltage supply 104, the output of which is applied through a transmit-receive relay circuit 110 to the other components of the transmitter via a conductor 117. The usual oscillator circuits 120 are provided, the output of which is applied via the conductor 125 to the usual modulator circuits 130 which in turn have the output thereof connected by a conductor 135 to output circuits 150, the output circuits 150 being connected by a conductor 155 to a transmitting antenna 156. Intelligence is impressed upon the transmission by the audio circuits 160–180 which have as an input thereto voice signals on a conductor 161 and control tones from a tone generating switching and timing circuit 200. One output from the audio circuits 160–180 is a control signal on a conductor 115 which is supplied to the transmit-receive relay circuit 110 for applying operating potential via the conductor 117 to the oscillator circuits 120, the modulator circuits 130, the output circuits 150 and the tone generating, switching and timing circuits 200. Another output from the audio circuits 160–180 is applied via the conductor 185 to the modulator circuits 130 to impress intelligence and/or control tones on the transmission from the transmitter 100. There further are provided call indicator circuits 300 which are connected to the transmit-receive relay circuits 110 and the modulator circuits 130.

The transmissions from the transmitter 100 are adapted to be received by the receiver 400 and more particularly by the antenna 402 thereof which is connected by a conductor 404 to the usual R.F. and I.F. and detecting or discriminator circuits 410–460. One output from the circuits 410–460 appears on the conductor 463 which applies a DC potential from the discriminator to the switching circuit 700 which in turn applies a control signal along the conductor 647 to the squelch circuits 640–660. Anoher signal from the circuits 410–460 is applied by the conductor 465 to the audio output circuits 470–480, to the tone control circuits 500, to the squelch circuits 640–660 and to the noise signal circuits 610–620. The audio output circuits 470–480 in turn have the output thereof connected by a conductor 477, to the audio speaker circuit 490 which provides the usual audio output from the transmitter 400 and in accordance with the present invention also is connected to the tone decoder circuits 810 which in turn are connected to the call indicator output circuits 850–880. The tone control circuits 500 have the output thereof applied by the conductor 650 to the squelch circuits 640–660 and the output of the squelch circuit is in turn applied on the conductor 670 to the audio output circuits 470–480 to control the operation thereof. Another input to the squelch circuit 640–660 is from the noise signal circuit 610–620 via the conductor 630, and another output from the noise signal circuits 610–620 appears on the conductor 630 which is applied to the monitor circuits 900.

Further details of the construction and operation of the transmitter 100 are set forth in the aforementioned co-pending application Ser. No. 350,163, and the description set forth therein is incorporated herein by reference. It is sufficient here to point out that the tone generating, switching and timing circuits 200 in the transmitter 100 are operable to provide the necessary control tones for activating the associated receivers or receiver 400. For example, a sequence of two tones, three tones . . . seven tones, etc., may be generated, the tone sequence being preferably generated automatically after being encoded therein. The tones are also preferably selected from a frequency band in the range from approximately 500 cycles per second to about 4,000 cycles per second with each tone being separated from adjacent tones by about 3⅓ percent of the frequency thereof. Further the time duration of each tone may be in the range of 5 to 100 milliseconds, a typical time duration being 15 milliseconds for a seven-tone sequence, or 75 milliseconds for a two-tone sequence, while a time gap between adjacent tones in the sequence should be as short as possible; as a consequence, for a seven-tone sequence, response time as low as 100 milliseconds are possible, all while providing greater security against false activation, as will be explained more fully hereinafter.

Figure 2:
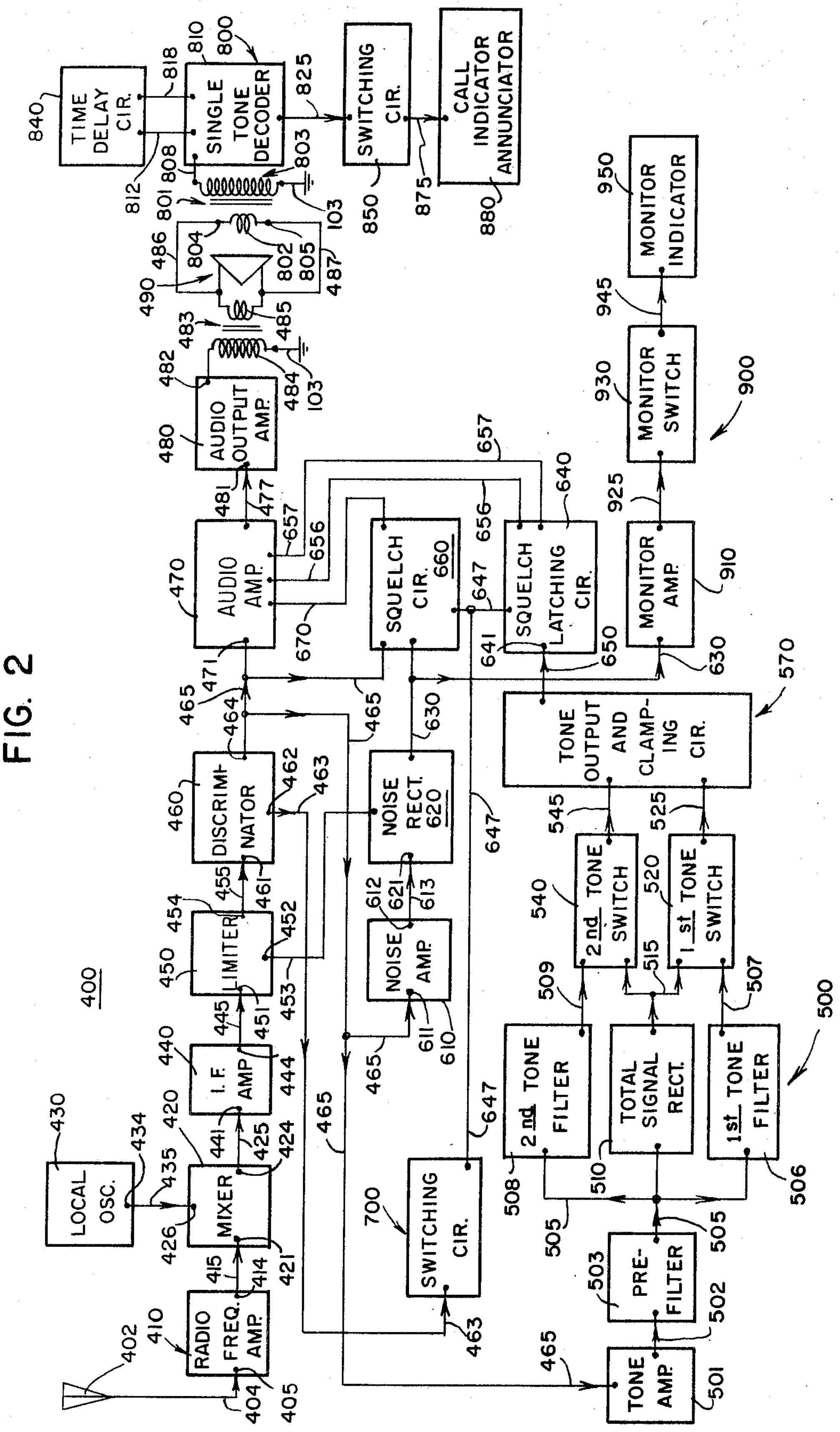
FIG. 2 is a more detailed block diagram of the receiver forming a part of the communication system illustrated in FIG. 1.

There is illustrated in FIG. 2 of the drawings a more complete block diagram of the radio receiver 400 forming a part of the communications system of the present invention. The carrier signal from the transmitter 100 is picked up on the antenna 402 and is conveyed by the conductor 404 to the input terminal 405 of a radio frequency amplifier 410; the output connection 414 of the amplifier 410 is connected by a conductor 415 to a mixer 420, and particularly to the input terminal 421 therefor; also connected to the mixer 420 is the output from a local oscillator 430 having an output terminal 434 connected by a conductor 435 to a second input terminal 426 for the mixer 420. The resultant I.F. signal appears at the output 424 of the mixer 420 and is conducted via the conductor 425 to the I.F. amplifier 440, and particularly the input terminal 441 thereof. The amplified signal appearing at the output terminal 444 of the amplifier 440 is conveyed via a conductor 445 to the input of a limiter 450 and particularly to the input terminal 451 thereof. A first output from the limiter appears on the terminal 454 and is connected by the conductor 455 as an input to the discriminator 460, the conductor 455 being connected to the input terminal 461, and an A.C. audio output from the discriminator 460 appears at the output terminal 464 that is connected to a conductor 465. The audio signal on the conductor 465 is applied to the audio amplifier 470 and particularly the input terminal 471 thereof, and provided that the tone control circuits to be described hereinafter have operated properly, an output from the audio amplifier 470 appears on a conductor 477 connected to the input terminal 481 of an audio output amplifier 480. The usual output transformer 483 is provided having a primary winding 484 of which one terminal is connected to the output terminal 482 of the amplifier 480 and the other terminal of which is grounded as at 103. The transformer 483 is also provided with a secondary winding 485 which has the terminals thereof connected to conductors 486 and 487 which are connected to a speaker 490 of conventional construction. It will be appreciated that the above describes a typical FM radio receiver of essentially conventional construction.

In accordance with the present invention, circuits are provided to block the output of the audio amplifier 470 until the desired control tone or series of control tones have been received by the received 400. To this end a tone control circuit generally designated by the numeral 500 has been provided and includes a tone amplifier 501 having the input thereof connected to the conductor 465 which carries the A.C. audio output from the discriminator 460. The output of the tone amplifier 501 is connected by the conductor 502 as an input to a pre-filter 503 having characteristics such that it will pass all tones in a series of tones designed to actuate the receiver 400. The output of the pre-filter 503 is applied by a conductor 505 as an input to a first tone filter 506 adapted to pass the first tone of the sequence of control tones and reject all the other signals, a second tone filter 508 adapted to pass only the second tone in a series of control tones and to reject all the other signals, and a total signal rectifier 510. The output of the first tone filter 506 appearing on the conductor 507 and the output of the total signal rectifier 510 appearing on a conductor 515 are applied as to inputs to a first tone switch 520 having the output thereof appearing on a conductor 525 and utilized as one input to a tone output and clamping circuit 570. The output of the second tone filter 508 appearing on the conductor 509 and the output from the total signal rectifier 510 appearing on the conductor 515 are applied as the inputs to a second tone switch 540 having the output thereof on a conductor 545 applied as a second input to the tone output and clamping circuit 570. The output from the circuit 570 is a control signal appearing on a conductor 650 connected to an input terminal 641 in a squelch latching circuit 640, the circuit 640 also being connected by a pair of conductors 656 and 657 to proper points in the audio amplifier 470, as will be described more fully hereinafter. The output of the squelch latching circuit 640 is applied to a conductor 647 as one input to a squelch circuit 660, the output of the squelch circuit 660 being connected by the conductor 670 to the audio amplifier 470.

Another input to the squelch circuit 660 is derived from the conductor 465 which carries the A.C. audio output from the discriminator 460. Yet another input to the squelch circuit 660 is derived from the noise circuit including a noise amplifier 610 and a noise rectifier 620. The input to the noise amplifier 610 is derived from the conductor 465 and is applied to the input terminal 611 and the output from the amplifier 610 appears on an output terminal 612 which is connected by a conductor 613 to the input terminal 621 of the noise rectifier 620. The output from the noise rectifier 620 appears on the conductor 630 and is another control input to the squelch circuit 660. Another output from the noise rectifier 620 is fed to the limiter 450 and particularly a second output terminal 452 thereof which is connected to the noise rectifier 620 by a conductor 453. Yet another input to the squelch circuit 660 is derived from a switching circuit 700 which has as an input thereto a D.C. potential derived from the discriminator 460 and obtained from an output terminal 462 thereof and connected to the switching circuit 700 by a conductor 463. The output from the switching circuit 470 is connected to the conductor 647 and is utilized as one of the inputs to the squelch circuits 660. As illustrated, the squelch circuit 660 is operative to render the audio amplifier 470 blocked until the proper concurrence of a signal from the tone control circuit 500 via the squelch latching circuit 640, a signal from the noise rectifier 620 and a signal from the switching circuit 700.

The receiver 400 of FIG. 2 is also provided with a paging alarm circuit which is connected to the secondary winding 485 of the audio output transformer 483, there being provided an isolating transformer 801 having a primary winding 802 provided with input terminals 804 and 805 connected to the conductor 486 and 487, respectively, and an output winding 803 having one terminal grounded as at 103 and having the other terminal connected by a conductor 808 as an input to a single tone decoder 810. The paging alarm tone is operative when applied to the conductor 810 to provide an output therefrom after the operation of a time delay circuit 840 which is connected to the decoder 810 by the conductors 812 and 818. An output from the decoder 810 appears on a conductor 825 connecting to a switching circuit 850 which when actuated provides a signal on the conductor 875 to operate a paging annunciator 880 such as the lights or the horn of an automotive vehicle.

There further is provided in the receiver 400 a monitor so that the user will have an indication that the channel to which the receiver is tuned is in use without operating switches or other equipment. The monitor circuit is generally designated by the numeral 900 and is connected to the conductor 630 which carries the output from the noise rectifier 620, the conductor 630 being connected as an input to a monitor amplifier 910, the output of the amplifier 910 being connected via a conductor 925 as an input to a monitor switch 930, the output of which in turn is connected by a conductor 945 as an input to a monitor indicator 950.

Figure 3:
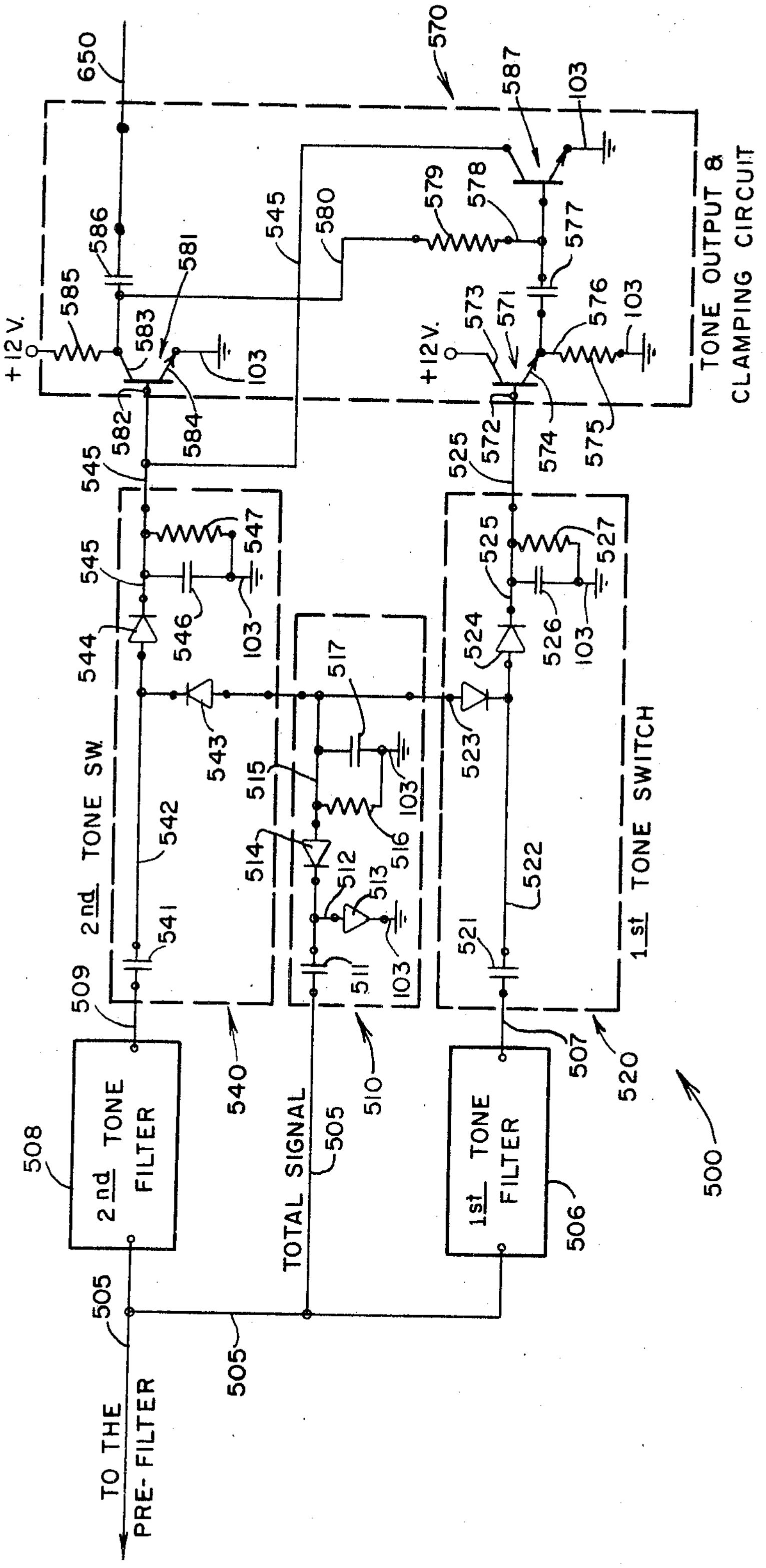
FIG. 3 is an electrical schematic diagram of the tone control circuits for the receiver of FIG. 2 wherein two control tones are used for actuating the receiver.

Referring to FIG. 3 of the drawings, there is illustrated in detail a portion of the tone control circuit 500 and particularly the tone switches 520 and 540, the total signal rectifier 510 and the tone output and clamping circuit 570. The signal appearing on the conductor 505 is an A.C. audio signal from the pre-filter 503 and is applied to one terminal of an input capacitor 511 in the rectifier circuit 510, the other terminal of the capacitor 511 being connected to a conductor 512. A first diode 513 connects the conductor 512 to ground as at 103; the conductor 512 is also connected to one terminal of a second diode 514 which has the other terminal thereof connected to a conductor 515. The conductor 515 is connected to one terminal of an output capacitor 517, the other terminal of the capacitor 517 being grounded as at 103 and a resistor 516 being provided and interconnecting the conductors 515 and 103 and in parallel with the capacitor 517. The circuit 510 rectifies the A.C. audio signal applied thereto and provides a reference potential on the conductor 515.

The first tone switch 520 has the input thereof connected to the conductor 507 which has applied thereto the output of the first tone filter 506, the conductor 507 more particularly being connected to one terminal of an input capacitor 521 in the switch 520, the other terminal of the capacitor 521 being connected to a conductor 522. The conductor 522 is connected to the conductor 515 by a diode 523 and further is connected to one terminal of an output diode 524, the other terminal of the diode 524 being connected to the output conductor 525. An output capacitor 526 is connected between the conductor 525 and the grounded conductor 103 and a resistor 527 also is connected between the conductors 525 and 103 and in parallel with the output capacitor 526.

The second tone switch 540 has the input thereof connected to the conductor 509 on which appears the output from the second tone filter 508, the conductor 509 being connected to one terminal of the input capacitor 541 which has the other terminal thereof connected to a conductor 542. A connection is made between the conductors 515 and 542 by a diode 543 and the conductor 542 is further connected to one terminal of an output diode 544, the other terminal of the diode 544 being connected to the output conductors 545. An output capacitor 546 interconnects the conductor 545 and the grounded conductor 103 and the resistor 547 is also connected between the conductors 545 and 103 and in parallel with the capacitor 546.

The tone output and clamping circuit 570 has two inputs thereto from the conductors 525 and 545, the conductor 525 being connected to a transistor 571 of the n-p-n type, and more particularly to the base 572 thereof, the collector 573 thereof being connected to a source of operating optential (for example, +12 volts), and the emitter 574 being connected via a conductor 576 and a resistor 565 to the grounded conductor 103. The conductor 576 is also connected to one terminal of an isolating capacitor 577, the other terminal of the capacitor 577 being connected to a conductor 578. The conductor 578 is connected to the base of a transistor 587 of the n-p-n type which has the collector thereof connected to the conductor 545 and the emitter thereof connected to the conductor 103. The input conductor 545 from the second tone switch 540 is likewise connected as an input to a transistor 581 and particularly to the base 582 thereof, the collector 583 being connected via a resistor 585 to a source of operating potential (for example, +12 volts), and the emitter 584 thereof is connected to the grounded conductor 103. The collector 583 is further connected by a conductor 580 to one terminal of a resistor 579 which has the other terminal thereof connected to the conductor 578, and the conductor 580 is further connected to one terminal of an output capacitor 586 which has the other terminal thereof connected to the conductor 650 which is an input connection to the squelch latching circuit 640 to be described in detail hereinafter.

In the operation of the circuits of FIG. 3, when there is only a noise or no input to the circuits on the conductor 505, the transistor 571 is blocked, i.e., is non-conducting, the transistor 587 is heavily conducting and appears as a short circuit between the base 582 of the transistor 581 and ground, whereby the transistor 581 is also blocked, i.e., non-conducting. The rectifier 510 rectifies the entire signal including control tones on the conductor 505 and establishes a reference potential on the coductor 515 proportional to the noise plus the control tones on the conductor 505. Upon the application of the first control tone in a sequence of control tones to the conductor 505, an output is provided from the first tone filter 506 provided that the frequency of the control tone is that to which the filter 506 is adjusted, and accordingly, a signal is applied to the capacitor 521 and when the potential on the conductor 522 exceeds the reference potential on the conductor 515, an output is obtained on the conductor 525 changing the potential thereof, whereby the transistor 571 begins to conduct. Conduction of the transistor 571 begins the charge of the capacitor 577 and the conduction of the transistor 587 actually increases. Immediately upon the removal of the first control tone from the conductor 505, the transistor 571 becomes blocked and the transistor 587 is likewise blocked during the discharge of the capacitor 577, the discharge of the capacitor 577 due to the interruption of conduction of the transistor 571 resulting in a negative pulse overriding the positive voltage applied to the base of the transistor 587 through the resistor 579.

In accordance with the present invention, as soon as the first tone of the sequence of tones is interrupted, the second control tone is applied from the conductor 505 through the filter 508 and to the input of the second tone switch 540, and when the signal on the conductor 542 becomes greater than the bias on the conductor 515, an output is obtained on the conductor 545 which is applied to the transistor 581. If the transistor 587 is still substantially blocked because of the interruption of the first tone as described above, then the signal from the second tone appearing on the conductor 545 will cause conduction of the transistor 581; it is noted that if no first tone has been received or if the first tone has not yet been interrupted, whereby the transistor 587 is still heavily conducting, then the transistor 581 will remain blocked even though a suitable control signal from the second tone switch 509 is applied to the conductor 545. At the end or termination of the second control tone to the second tone switch 540, the signal on the conductor 545 will be removed thus blocking the transistor 581 and permitting the capacitor 586 which has heretofore been partially charged during the conduction of the transistor 581 to discharge thus providing a positive pulse as an output on the conductor 650.

The positive pulse which is the output from the circuit 570 on the conductor 650 is applied to the squelch latching circuit 640. Further details of the squelch circuit 640 are disclosed in the aforementioned co-pending application Ser. No. 350,163, and the description thereof is incorporated herein by reference. Further details of the audio amplifier 470, the noise amplifier 610 and the noise rectifier 620 are also set forth in the aforementioned co-pending application Ser. No. 350,163 and the description thereof is incorporated herein by reference.

In a typical example of the tone control circuit 500, the various components thereof would have the following values: capacitor 511, 0.02 μf.; resistor 516, 1 megohm; capacitor 517, 0.02 μf.; capacitor 521, 820 μμf.; capacitor 526, 0.01 μf.; resistor 527, 1 megohm; capacity 541, 820 μμf.; capacitor 546, 0.01 μf.; resistor 547, 1 megohm; resistor 575, 470,000 ohms; capacitor 577, 0.01 μf.; resistor 579, 22 megohms; resistor 585, 1 megohm; and the capacitor 586, 0.02 μf.

Figure 3A:
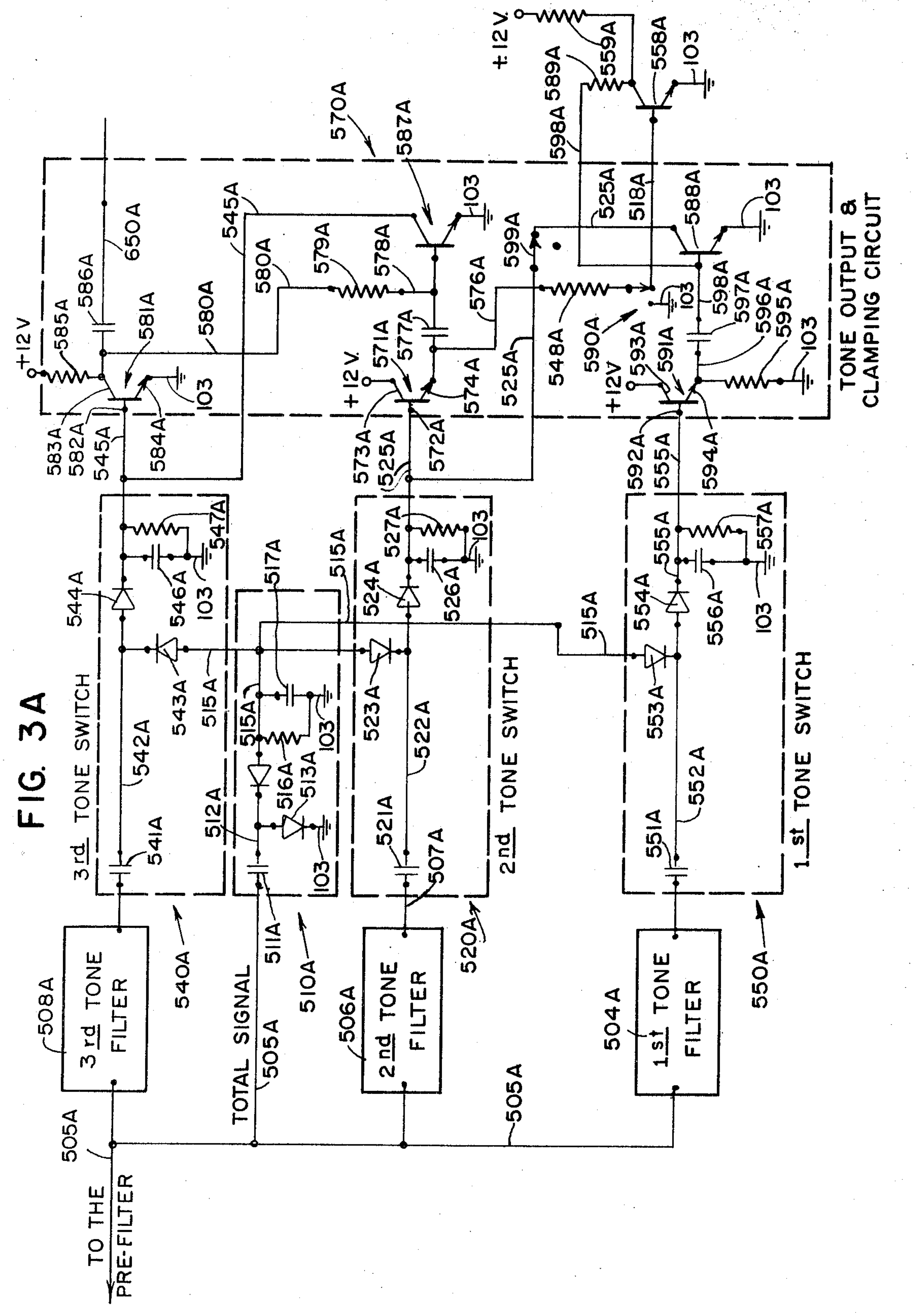
FIG. 3A is a schematic electrical diagram similar to FIG. 3 illustrating the tone control circuits for a receiver wherein three control tones are used for actuating the receiver.

There is shown in FIG. 3A of the drawings a modification of the tone filters, the tone switching circuits and the tone output and clamping circuit illustrated in FIG. 3, the circuits of FIG. 3A being adapted and arranged to operate when the selective calling control tones is either a series of two control tones or a series of 3 control tones. Where appropriate, like numerals have been used in FIG. 3A for like parts in FIG. 3 with the addition thereto of the suffix A, whereby it will be seen that the input conductor 505A corresponds to the input conductor 505, the second tone filter 506A corresponds to the first tone filter 506, the third tone filter 508A corresponds to the second tone filter 508, the total signal rectifying circuit 510A corresponds to the circuit 510, the second tone switch 520A corresponds to the first tone switch 520, and the third tone switch 540A corresponds to the second tone switch 540. Further in the tone output and clamping circuit 570A, those parts disposed above the switches 590A and 599A and including the circuits for the transistors 571A and 581A and 587A correspond to the like circuit elements in the circuits for the transistors 571 and 581 and 587, respectively, in FIG. 3; and in fact when the switch 599A is operated so that its movable contact is open breaking the conductor 525A and when the switch 590A is operated so that the movable contact thereof is connected to the grounded conductor 103, the tone operating and clamping circuit of 570A is identical in construction and operation to the tone output and clamping circuit 570 of FIG. 3.

When the switches 590A and 599A are placed in the position illustrated in FIG. 3A, and particularly when the movable contact of switch 590A is in connection with the conductor 516A, and switch 599A is closed, the circuits of FIG. 3A are in condition so that they will be actuated only by a predetermined sequence of 3 control tones, and more particularly, additional circuits are connected. Another tone filter 504A is provided which in fact becomes the first tone filter and is adjusted and arranged to be responsive only to the first selected tone in the series of control tones and serves to provide in the output thereof a signal only when the proper control tone is applied as an input thereto from the conductor 505A. The output of the first tone filter 504A is connected to the first tone switch 550A and particularly to one terminal of an input capacitor 551A, the other terminal of the capacitor 551A being connected to the conductor 552A. The conductor 552A is connected to the reference potential conductor 515A through a diode 553A, and is connected to the output of the conductor 555A through a second diode 554A. The output conductor 555A is provided with an output capacitor 556A connected to the grounded conductor 103 and a resistor 557A interconnects the conductors 555A and 103 in parallel with the output capacitor 556A.

The conductor 555A connects with the tone output and clamping circuit 570A and more particularly is connected to the base 592A of a transistor 591A, the collector 593A thereof being connected to an operating potential (for example, +12 volts), and the emitter 594A thereof is connected to a conductor 596A. The conductor 597A has one connection to one terminal of a resistor 595A which has the other terminal thereof grounded as of 103, and another connection to one terminal of a capacitor 597A which has the other terminal thereof connected to the conductor 598A. The conductor 598A connects the output of the transistor 591A to the base of a transistor 588A, the collector thereof being connected to the conductor 525A and the emitter thereof being grounded as at 103. The conductor 598A further connects to a second transistor 558A which serves to clamp the transistor 588A in the off condition when the transistor 571A is conducting, and more particularly the conductor 598A is connected to one terminal of a resistor 589A which has the other terminal thereof connected to the collector of the transistor 558A. The collector of the transistor 558A is further connected through a limiting resistor 559A to a source of operating potential (for example, +12 volts), the emitter of the transistor 558A is grounded as at 103, and the base of the transistor 558A is connected to a conductor 516A which serves to supply current from the transistor 571A and the capacitor 577A which are a part of the output circuit associated with the second tone switch 520A, thereby controlling the voltage applied to the base of transistor 558A. More specifically, when the switches 590A and 599A are in the position illustrated in FIG. 3A, the conductor 516A is connected thereby to one terminal of the resistor 548A which has the other terminal thereof connected by the conductor 576A to the transistor 571A, and more particularly the emitter 574A thereof, and the collector of the transistor 588A is connected to the base of the transistor 571A.

In the operation of the tone control circuit of FIG. 3A, the series of control tones received by the transmitter 400 is applied thereto via the conductor 505A and the total signal is applied to the rectifier circuit 510A which quickly establishes a reference potential on the conductor 515A proportional to the total signal. If the total signal includes the first tone to which the filter 504A is tuned, the first tone will be applied to the first tone switch 550A and as soon as the value thereof exceeds the reference potential in the conductor 515A, an output will be obtained on the conductor 555A. Prior to the reception of a signal on the conductor 555A, the transistor 591A is blocked and the transistor 588A is conducting and appears as an open circuit between the base of the transistor 571A and ground. Upon the application of the first control tone signal along the conductor 555A to the transistor 591A, the transistor 591A begins to conduct and to charge the capacitor 597A, the transistor 588A also conducting harder during the charge of the capacitor 597A. Upon the interruption of the first control tone with the concurrent removal of a signal from the conductor 555A, the transistor 591A again becomes blocked and the capacitor 597A discharges which results in a negative pulse momentarily blocking the transistor 588A. This removes the short circuit on the base of 572A of the transistor 571A. The transistor 571A now conducts if the second tone in the series of control tones produces a signal on the conductor 525A, and this conduction of the transistor 571A charges the capacitor 577A, and also causes the current to flow via the conductor 576A through the resistor 548A to the conductor 518A to the base of the transistor 558A so that it saturates, effectively grounding its collector thereby grounding the resistors 559A and 589A at their common connection and thereby removing the plus potential previously applied via the resistor 589A to the base of the transistor 588A via the conductor 598A so that the transistor 588A is blocked for the duration of the second tone. This removes the short from the base 572A of the transistor 571A for the duration of said tone. The transistor 587A which has been heretofore conducting will conduct even harder during the charging of the capacitor 577A and as a result the transistor 581A will continue to have its input shorted to ground. At the end of the second control tone the signal produced thereby will be removed from the conductor 525A thus blocking the transistor 571A and the discharge of the capacitor 577A will momentarily hold transistor 558A in conduction and provide a negative pulse which is applied to the transistor 587A which will block the transistor 587A and allow conduction of the transistor 581A provided that the appearance of the third tone on the conductor 505A results in a corresponding signal on the conductor 545A also applied to the transistor 581A, the conduction of the transistor 581A serving to discharge the capacitor 586A. When the third tone ends, the corresponding signal on the conductor 545A will be removed thus blocking the transistor 581A and causing the capacitor 586A to charge. The charge of the capacitor 586A will result in a positive pulse on the conductor 650A which is applied as an input to the squelch latching circuit 640.

In the typical operating example of the circuit of FIG. 3A, the circuit components of the circuits 510A, 520A, 540A and 570A above the switch 590A may have the same values as those with the correspondingly numbered circuit components in FIG. 3. In the tone switch 550A, the capacitor 551A may have a value of 820 $\mu\mu$f., the capacitor 556A has a value of 0.01 $\mu$f., the resistor 557A has a value of 1 megohm. In that portion of the tone output and clamping circuit below the switch 590A, the resistor 595A has a value of 470,000 ohms, the capacitor 597A has a value of 0.01 $\mu$f., the resistor 589A has a value of 22,000 ohms, and the resistor 559A has a value of 3.9 megohms.

Figure 4:
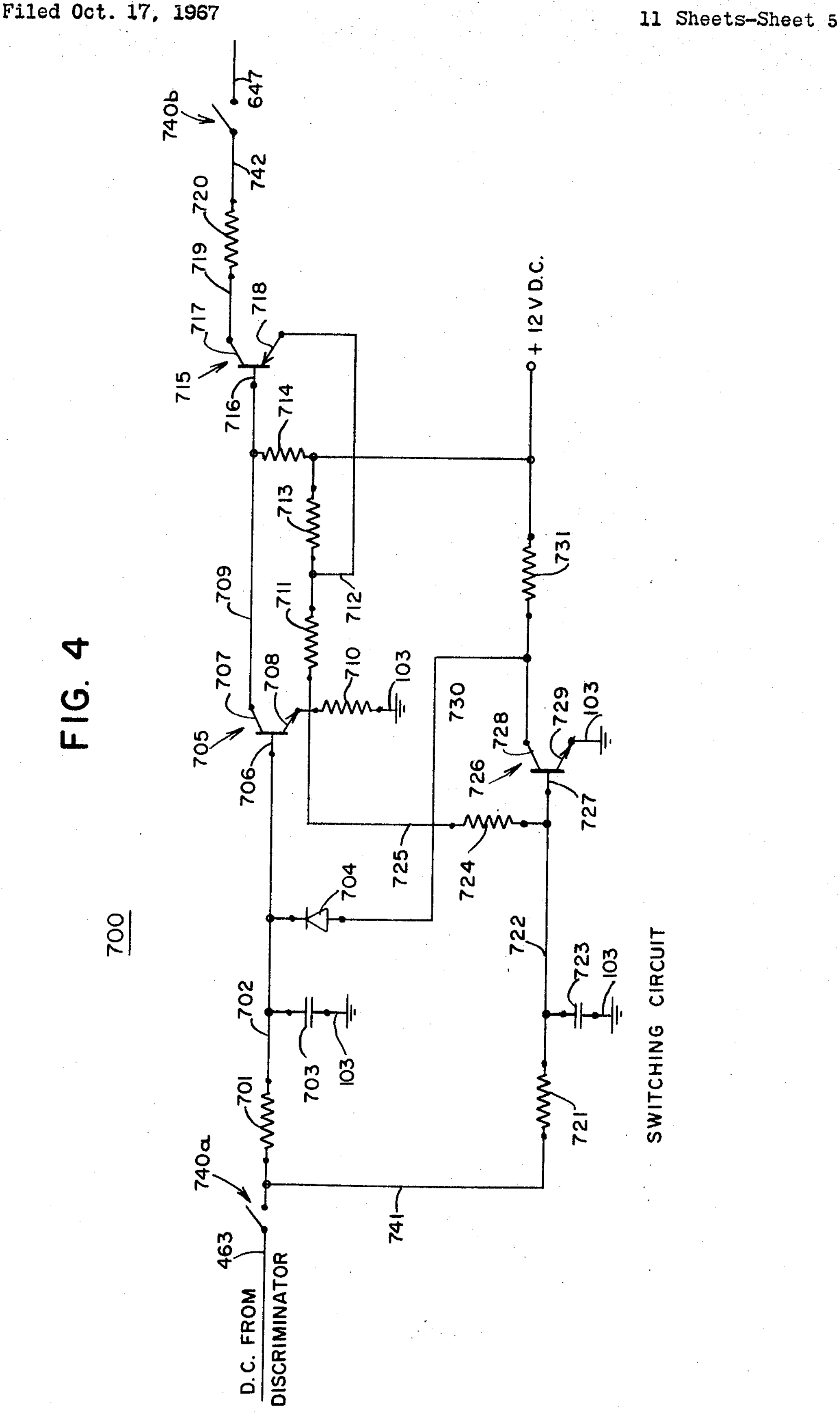
FIG. 4 is a schematic electrical diagram of a switching circuit forming a part of the receiver of FIG. 2.

The details of the switching circuit 700 are illustrated in FIG. 4 of the drawings, the switching circuit 700 operating to interrupt the audio output of the receiver 400 through operation of the squelch circuit 660 to prevent actuation of the receiver 400 by strong transmission on channels adjacent to that on which the receiver 400 is tuned to operate. The input to the switching circuit 700 is a D.C. voltage from the discriminator 460 (see FIG. 2) on the conductor 463, the potential on the conductor 463 being essentially zero when the carrier signal applied to the receiver 400 is that for which the receiver is tuned, and the D.C. potential on the conductor 463 rising to about 6 volts when a carrier signal is received that is approximately 7 kilocycles away from the carrier signal for which the receiver 400 is tuned.

In accordance with the present invention, the switching circuit 700 may be put in or removed as desired and to this end a switch 740 is provided having a first switch section 740*a* in the conductor 463 and a second switch section 740*b* adapted to connect the squelch circuit 660. The switch section 740*a* more particularly connects to an input conductor 741 which is connected to one terminal of a first resistor 701 which has the other terminal thereof connected to a conductor 702, and connects to one terminal of a second resistor 721 having the other terminal thereof connected to a conductor 722. The conductor 702 is connected to the grounded conductor 103 through a capacitor 703 and also connects to a transistor 705 of the n-p-n type and particularly to the base 706 thereof. The collector 707 of the transistor 705 is connected to a conductor 709 and the emitter 708 is connected to the grounded conductor 103 through a resistor 710.

The conductor 722 is connected to the emitter 708 of the transistor 705 through a resistor 724 and a conductor 725, and is also connected as an input to a transistor 726 of the n-p-n type and particularly the base 727 thereof. The emitter 729 of the transistor 726 is connected to the grounded conductor 103 and the collector 728 is connected to a conductor 730 which in turn is connected through a limiting resistor 731 to a source of operating potential (for example, +12 volts). A diode 704 is provided interconnecting the conductor 702 and 730 and more particularly interconnects the base 706 of the transistor 705 and the collector 728 of the transistor 726. The source of operating potential is also connected to one terminal of a resistor 714 which has the other terminal thereof connected by the conductor 709 to the collector 707 of the transistor 705, and also is connected to one terminal of a resistor 713 having the other terminal thereof connected by a conductor 712 to one terminal of a resistor 711 which has the other terminal thereof connected by the conductor 725 to the emitter 708 of the transistor 705. The conductor 709 also connects the collector 707 of the transistor 705 to another transistor 715 of the p-n-p type, and particularly to the base 716 thereof. The emitter 718 of the transistor 715 is connected by the conductor 712 to the junction of the resistors 711 and 713, and the collector 717 of the transistor 715 is connected by a conductor 719 to one terminal of a resistor 720 which has the other terminal thereof connected by a conductor 742 to the switch 740*b* that connects when closed to the output conductor 647 in communication with the control grid of the squelch tube in the squelch circuit 640.

In the operation of the switching circuit 700 when the switch section 740*a* and 740*b* are closed, there is no output therefrom on the conductor 647 when the carrier signal applied to the receiver 400 is that for which it is tuned since the D.C. voltage from the discriminator on the conductor 463 will be essentially zero. Once an on-frequency carrier signal is received by the transmitter 400, the D.C. output from the discriminator 460 will remain substantially zero and will not rise above six volts in the usual receiver even though the frequency of the carrier signal drifts up to as much as 7 kilocycles of the frequency to which the receiver is tuned.

However, if the receiver 400 is not receiving an on-frequency signal, and there is applied thereto a strong signal from an adjacent channel which might tend to operate the receiver 400, the D.C. voltage from the discriminator 460 applied along the conductor 463 will exceed 6 volts. The application of such a potential at the input of the switching circuit 700 causes a positive output to be applied thereby to the conductor 647 connected to the control grid of the squelch tube 661, and accordingly, the squelch tube 661 conducts heavily and holds the audio amplifying tube 472 in a non-operating condition, thus to block the audio output from the receiver 400.

Figures 5, 6:
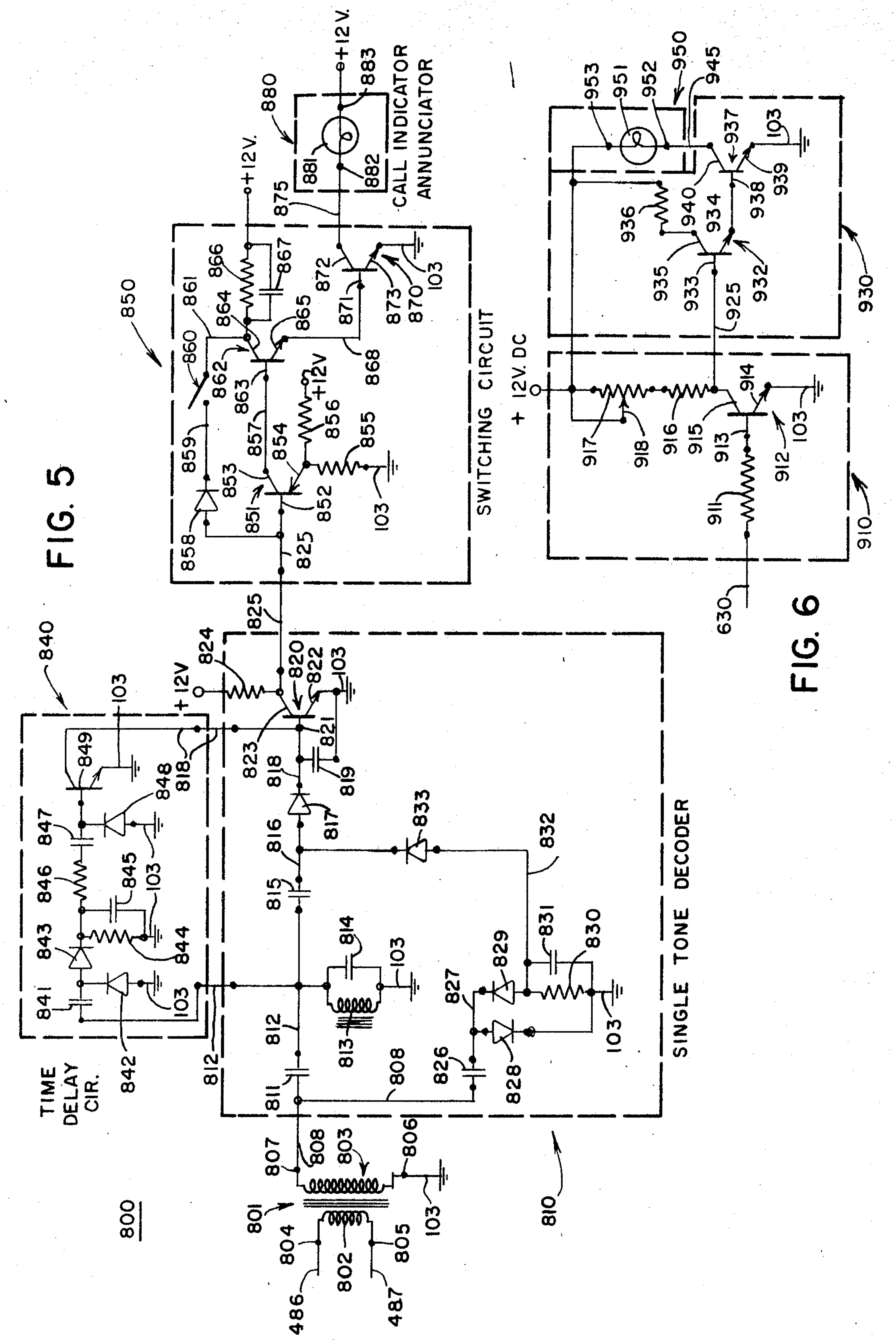
FIG. 5 is a schematic electrical diagram of the call indicator circuit forming a part of the receiver of FIG. 2.
FIG. 6 is a schematic electrical diagram of the monitoring circuit forming a part of the receiver of FIG. 2.

The call indicator system is generally designated by the numeral 800 and the details thereof are illustrated in FIG. 5 of the drawings. The input to the circuit 800 is from the conductors 486 and 487 connected to the terminals of the audio output transformer 483 (see FIG. 2), which input is applied to a step-up transformer 801 and particularly to the primary winding 802 thereof at the terminals 804 and 805, respectively. The transformer 801 has a secondary winding 803 provided with one terminal 806 that is connected to the grounded conductor 103 and a second terminal 807 connected to a conductor 808 which provides an input to the single tone decoder 810.

The tone decoder 810 comprises a tone filter network including an input capacitor 811 having one terminal thereof connected to the conductor 808 and having the other terminal thereof connected to a conductor 812, the conductor 812 connecting to a filter circuit including an inductor 813 and a capacitor 814 arranged in parallel circuit and having one of the common terminals thereof connected to the conductor 812 and having the other common terminals thereof connected to the grounded terminal 103. The conductor 812 connects with one terminal of an output capacitor 815 which has the other terminal thereof connected to a conductor 816. The decoder 810 further comprises a total signal rectifying circuit including an input capacitor 826 having one terminal thereof connected to the input conductor 808 and having the other terminal thereof connected to a conductor 827. A first diode rectifier 828 is provided having one terminal thereof connected to the conductor 827 and the other terminal thereof connected to the grounded conductor 103, and a second diode rectifier 829 is provided having one terminal thereof connected to the conductor 827 and the other terminal thereof connected through a conductor 832 and a resistor 830 to the grounded conductor 103, the diodes 828 and 829 being oppositely poled. A filtering capacitor 831 is connected between the conductor 832 and the grounded conductor 103. A rectified and filtered D.C. potential is provided on the conductor 832 that is proportional to the total signal received on the conductor 808 and serves as a reference voltage.

A diode 833 interconnects the conductors 816 and 832, and the conductor 816 further is connected to one terminal of an output diode 817 which has the other terminal thereof connected by a conductor 818 to an output transistor 820 of the n-p-n type, and more particularly to the base 821 thereof. The emitter 822 of the transistor 820 is connected to the grounded conductor 103 and a capacitor 818 is also provided interconnecting the conductor 819 and the grounded conductor 103. The collector of the transistor 820 is connected through a conductor 825 and a limiting resistor 824 to a source of operating potential (for example, +12 volts). The output of the decoder 810 appears on the conductor 825 and is connected to the switching circuit 815.

A time delay circuit 840 is provided to insure that the tone being decoded at the circuit 810 has the proper time duration, the time delay circuit being connected between the conductors 812 and 818. More specifically, the conductor 812 is connected to one terminal of an input capacitor 841 which as the other terminal thereof is connected to one terminal of a first diode 842 having the other terminal thereof connected to the grounded conductor 103 and is connected to one terminal of a second diode 843 which has the other terminal thereof connected to one terminal of a resistor 844 and one terminal of a capacitor 845, the other terminals of the resistor 844 and the capacitor 845 being connected to the grounded terminal 103. The common junction between the diodes 843, the resistor 844 and the capacitor 845 is connected to one terminal of a resistor 846 which has the other terminal thereof connected to one terminal of a capacitor 857, the other terminal of the capacitor 847 being connected first to one terminal of a diode 848 having the other terminal thereof connected to the grounded conductor 103, and secondly being connected to the base of a transistor 849 of the n-p-n type. The emitter of the transistor 849 is connected to the grounded conductor 103 and the collector of the transistor 849 is connected to the conductor 818. The time delay circuit 840 operates to ground the input to the transistor 820 appearing on the conductor 818 until the expiration of the desired time delay period, at which time the transistor 849 operates and appears as an open circuit thus placing the operation of the transistor 820 under the control of the output from the tone filter circuit, if any, appearing on the conductor 818.

The switching circuit 850 has as an input thereto the signal appearing on the conductor 725, the conductor 825 being connected to an input transistor 851 of the p-n-p type, and particularly to the base 852 thereof. The emitter 854 of the transistor 851 is connected in a voltage divider network including the resistors 855 and 856 connected in series with each other and between the grounded conductor 103 and a suitable source of operating potential (for example, +12 volts), the emitter 854 being more particularly connected at the junction between the resistors 855 and 856. The collector 853 of the transistor 851 is connected by a conductor 857 to a transistor 862 of the n-p-n type, and more particularly to the base 863 thereof. The collector 864 of the transistor 862 is connected through a resistor 866 to a suitable source of operating potential (for example, +12 volts), a capacitor 867 being provided in parallel with the resistor 866. The emitter 865 of the transistor 862 is connected by a conductor 868 to an output transistor 870 of the n-p-n type, and more particularly to the base 871 thereof. The emitter 873 of the transistor 870 is connected to the grounded conductor 103, and the collector 872 is connected to an output conductor 875. The conductor 875 is connected to the grounded conductor 103, and the collector 872 is connected to an output conductor 875. The conductor 875 is connected to the call indicator annunciator 880 which as illustrated has a light bulb 881 having an input terminal 882 connected to the conductor 875 and an output terminal 883 connected to the source of operating potential (for example, +12 volts).

In the operation of the call indicator system of the present invention, the operator at the transmitter 100 would first attempt to contact the operator at the receiver 400 by simply closing the transmit switch which would turn on the selected receiver 400. Obtaining no response from the operator of the receiver 400, the operator of the transmitter 100 would close a switch (not shown) in the call indicator generator circuit 300 which would thereafter generate a call indicator tone. The call indicator tone so generated would be applied through a timing circuit which will emit a series of pulses of predetermined duration and frequency of occurrence at the operating frequency of the call indicator tone. In order to permit the operator to lock the output of call indicator on, a device has been provided in the form of a diode 858 having one terminal thereof connected to the conductor 825 and the other terminal thereof connected by a conductor 859 to a cut-off switch 860 which is further connected by a conductor 861 to the collector 864 of the transistor 862. Closure of the switch 860 serves to lock the switching circuit 850 on when triggered, thereby actuating the call indicator annunciator 880 continuously when the required call indicator tone of the required duration is received in the input transformer 801.

In the receiver 400, the tone control circuit 500 will typically already have operated to provide an output from the audio amplifier 470 (see FIG. 2), and accordingly, the call indicator tone will be passed through the audio amplifier 470, the audio output amplifier 480, the audio output transformer 483 to the call indicator input transformer 801 (see FIG. 5). The appearance of the required tone at the input transformer 801 will cause operation of the rectifying diodes 828 and 829 to produce a D.C. reference potential or bias on the conductor 832, the value of the reference potential being proportional to the strength of the total signal appearing on the conductor 808 and being negative in value with the circuit components arranged as illustrated. Only the call indicator tone will be passed by the tone filter circuit including the capacitor 811, the inductor 813 and the capacitor 814 and through the capacitor 815 to the conductor 816. In order to achieve an output on the conductor 818, the call indicator tone appearing on the conductor 816 must have a peak-to-peak value in excess of the bias on the conductor 832 before the diode 817 will conduct to provide an output on the conductor 818 to charge the output capacitor 819. In effect there is provided a filter followed by a voltage doubler circuit which is biased in such a way that there is no D.C. output voltage at 818 until the bias provided at 832 is exceeded. Thus tbe band width over which the tone will produce a D.C. output can be readily controlled by controlling the relationship between the filter output voltage and the bias voltage. With the particular filter shown, for example capacitor 811 may be increased to produce a greater tone output and consequently a wider band width or reduced to similarly produce a narrower band width. The band width over which a D.C. output voltage is obtained will be the band width over which the transistor 820 may be actuated so as to produce an output. This band width is substantially constant at all usable signal levels since the frequency at which the tone filter output and the D.C. bias outputs are equal will not change with signal level.

Even through the frequency of the call indicator tone through the decoder 810 is correct and of sufficient amplitude, there will be no output from the output transistor 820 until the time delay circuit 840 has operated to render the transistor 820 conductive, as has been explained above. After the predetermined time delay fixed by the circuit 840, the continued application of the call indicator tone signal of sufficient amplitude will cause an output from the transistor 820 on the conductor 825. The signal on the conductor 825 will operate the switch circuit 850 to render the transistor 870 conductive so as to operate the light 881. The light 881 will be turned on and off at the repetition rate of the bursts of call indicator tone if the switch 860 is open as shown. If the switch 860 is closed the light will come on and stay on to indicate the unit has been called.

As pointed out above, there will be no output from the single tone circuit 810 until the value of the tone signal appearing on the conductor 816 has a peak-to-peak value in excess of the bias potential on the conductor 832 derived from the total signal. As a consequence, the circuit 810 has a substantial constant band width versus tone signal level which is in turn determined by the amplitude versus frequency characteristics of the two paths through the input capacitors 811 and 826 respectively to the conductor 816. The circuit 810 can be adjusted so that an output control voltage is obtained over a very narrow frequency range compared to the band width of the paging tone filter comprising the components 811, 813 and 814. The rise time of that filter will be the limiting factor in controlling the response time of the output rather than the narrow frequency range of control exhibited by the complete circuit 810, and in fact the total circuit 810 may be considered to be a "filter" which appears to have a response time which is much shorter than would be predicted by the band width thereof. In this connection, it is pointed out that the total signal rectifier 510 in combination with the first tone switch 520 forms a single tone decoder of the same construction and characteristics as the single tone decoder 810 described above, and likewise the total signal rectifier 510 in combination with the second tone switch 540 comprises a single tone decoder of the same construction and characteristics as the circuit 810 described above. Tone switches 520 and 540 further are voltage doubler circuits provided with a D.C. bias by the total signal rectifier 510, which bias controls the band width of both tone outputs as explained earlier.

In a typical operating example of the call indicator circuit 800 of FIG. 5, the various components thereof have the following values: the capacitors 811, 540 $\mu\mu$f.; the capacitor 826, 0.02 $\mu$f; the capacitor 815, 820 $\mu\mu$f.; the resistor 830, one megohm; the capacitor 831, 0.02 $\mu\mu$f.; the capacitor 819, 0.02 $\mu$f.; the resistor 824, 3.9 megohms; the capacitor 841, 820 $\mu\mu$f.; the resistor 844, 6.8 megohms; the capacitor 845, 0.01 $\mu$f.; the resistor 846, 6.8 megohms; the capacitor 847, 0.2 $\mu$f.; the resistor 855, 4,700 ohms; the resistor 856, 4,700 ohms; the resistor 866, 1,000 ohms; and the capacitor 867, 0.02 $\mu$f.

The time delay circuit 840 also presents substantial advantages over prior circuits utilized heretofore, this circuit providing a D.C. output which in effect grounds the input to the transistor 820 for the time delay period. The output of the time delay 840 has an amplitude that varies with the output of the filter comprising the components 811, 813 and 814; in other words, the delay voltage generated by the circuit 840 is proportional only to the signal for the frequency at the resonance of the tone filter. Since the time delay of the circuit 840 and the output voltage from the decoder 810 are generated by the identical signal, the time delay is substantially constant regardless of the signal level of the call indicator tone and regardless of what off-frequency signal may precede the call indicator tone.

The details of construction of the monitoring circuit 900 are illustrated in FIG. 6 of the drawings, wherein it will be seen that the conductor 630 from the noise rectifier 620 (see FIG. 2 also) is connected as the input to the monitor amplifier 910 and particularly to one terminal of an input resistor 911 which has the other terminal thereof connected to an amplifying transistor 912 of the n-p-n type, and specifically the base 913 thereof. The emitter 914 of the transistor 912 is connected to the ground conductor 103, and the collector 915 is connected by the conductor 925 to one terminal of a resistor 916 having the other terminal thereof connected to one terminal of a rheostat 917, the rheostat 917 having a movable contact 918 thereon which connects to the other terminal thereof and is also connected to a source of operating potential (for example +12 volts D.C.).

Figure 9:
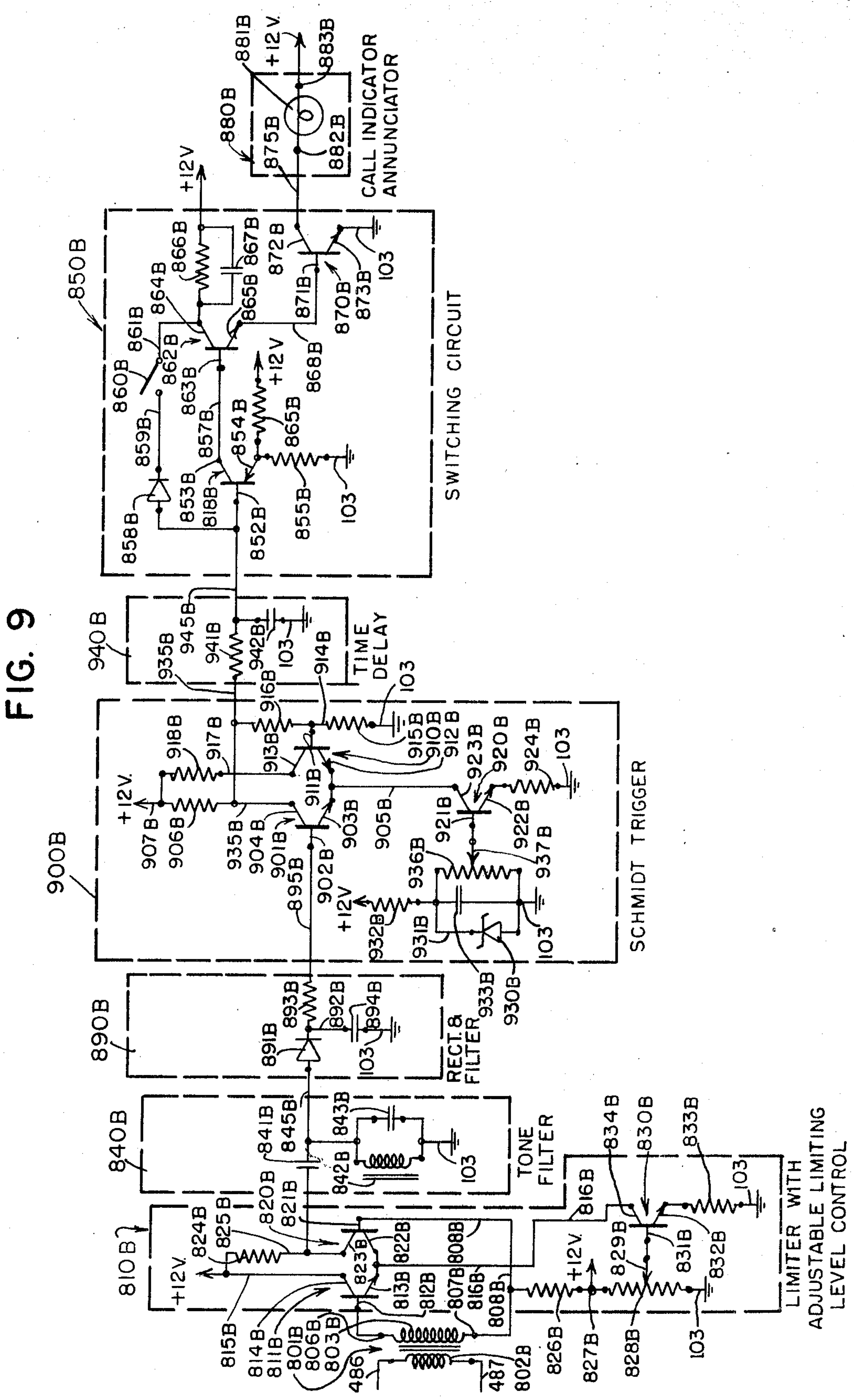
FIG. 9 is an electrical schematic diagram of the call indicator circuit forming a part of the receiver of FIG. 8.

The output from the monitor amplifier 910 appears on the conductor 925 and is applied as an input to the monitor switch 930, and specifically to a transistor 932 of the n-p-n type, and particularly to the base 933 thereof. The collector 935 of the transistor 932 is conected through a limiting resistor 936 to the source of operating potential, and the emitter 934 is connected to a transistor 937 of the n-p-n type, and particularly to the base 938 thereof. The emitter 939 of the transistor 937 is connected to the grounded conductor 103, and the collector 940 is connected by the conductor 945 to the monitor indicator 950. As illustrated in FIG. 9 the monitor indicator 950 is a lamp bulb 951 having one terminal 952 thereof connected to the conductor 945 and having the other terminal 953 connected to the source of operating potential.

When the receiver 400 does not have applied thereto the carrier signal of the frequency to which the receiver 400 is tuned, the noise rectifier 620 (see FIG. 2) provides on the conductor 630 a substantial potential which causes heavy conduction of the transistor 912, and accordingly the bias on the conductor 945 is relatively low and the transistor 937 appears as an open circuit to the light bulb 951, thus preventing operation thereof. Upon the receipt by the receiver 400 of a carrier signal to which the receiver 400 is tuned, the noise rectifier 620 operates and the potential on the conductor 630 substantially decreases, and accordingly, there is less conduction of the transistor 912, thus increasing the potential on the conductor 925. Increasing the potential on the conductor 925 permits the transistor 937 to conduct and the current therefrom flows through the lamp 951 causing operation thereof. Operation of the lamp 951 tells the operator of the receiver 400 that the broadcasting channel assigned thereto is in use and therefore the operator will not attempt to operate his transmitter so long as the light 950 is operating, thus permitting the operator to monitor his assigned frequency channel continuously and without effort. The rheostat 917 provides for a control of the sensitivity of the monitoring system 900 by adjusting the level of the potential on the conductor 925.

In a typical example of the monitoring system 900, the various components thereof have the following values: the resistor 911, 3.9 megohms; the resistor 916, 100,000 ohms; the resistive element of the rheostat 917 2 megohms; the resistor 936 1,000 ohms.

The operation of the communication system of the present invention as illustrated in FIGS. 1 to 6 will now be described. Assuming first that an operator at the transmitter 100 wishes to call a selected receiver 400 using a sequence of two control tones, the power supply 104 is energized so as to apply operating potential to the control tone circuits 200 so that they may achieve stable operating characteristics. The operator next selects the first and second control tones, respectively. The operator next closes the transmit switch which applies a potential along the conductor 115 which closes the transmit relay, thus to apply operating B+ potential from the conductor 117 to all remaining components of the transmitter, whereby the transmitter 100 begins to operate and transmits the assigned fundamental carrier frequency thereof modulated at the frequency of the first control tone.

In the meantime, the receiver 400 is normally continuously supplied with operating potential and is in readiness at all times to receive carrier signals supplied thereto. As soon as the operator of a transmitter 100 transmitting at the assigned frequency of the receiver 400 begins operation, the carrier signal and all modulation thereon including the control tones will be passed from the antenna 402 to the discriminator 460. Prior to the reception of the assigned carrier signal by the receiver 400, the noise rectifier 620 has provided a potential on the conductor 630 which holds the squelch tube in circuit 660 heavily conducting, thereby holding the audio amplifying circuit 470 in an inoperative condition. Application of the carrier signal of the proper frequency to the receiver 400 will cause the noise rectifier 620 to operate to remove the signal from the conductor 630 thus to remove one of the three biases from the squelch tube of circuit 660 tending to hold it heavily conducting. A strong on-frequency carrier signal also will cause the switching circuit 700 to operate to remove any potential produced thereby from the control grid of the squelch tube in the circuit 660.

The application of the first control tone of the series of two control tones on the assigned carrier signal will provide an input to the tone control circuit 500 which will cause the first tone switch 520 to be placed in a ready condition, whereby upon the termination of the first control tone, the tone switch 520 operates to place the circuit under the control of the second tone switch 540, and if the second control tone is immediately received by the receiver 400 and applied through the second tone filter 508 to the tone switch 540, the tone switch 540 will be placed in a ready condition so that upon the termination of the second control tone, a positive pulse will be applied through the capacitor 586 to the squelch latching circuit 640 which holds the squelch tube heavily conducting, thus rendering the audio amplifier 470 operative. In other words, the simultaneous concurrence of the proper signals from the tone switching circuit 500, the noise rectifier 620 and the switching circuit 700 upon the control grid of the squelch tube will change the squelch tube from a first condition substantially cutting off operation of the audio amplifier 470 to a second condition wherein the audio amplifier 470 can operate to amplify and pass the A.C. audio signal on the conductor 465 to the subsequent audio output stages.

The squelch tube having once been placed in the second operating condition thereof wherein the audio amplifying stage 470 is operative, a feed back circuit is established, whereby the squelch circuit 660 is entirely under the control of the noise rectifier 620. Accordingly, the audio amplifier 470 will continue to operate so long as the carrier signal of the proper frequency is applied to the receiver 400. If the carrier signal is interrupted for a short period of time, the capacitor 586 and the resistor in the squelch circuit 660 form a time delay circuit which will maintain the squelch circuit 660 under the control of the noise rectifier 620 for a period up to about 0.5 seconds; however, if the carrier signal is interrupted for a longer period of time, then the circuits revert to the original conditions thereof and the squelch circuit 660 is again under the control of the tone control circuit 500, the noise rectifier 620 and the switching circuit 700, and only a subsequent concurrence of the appropriate signals from all three circuits will again permit the squelch circuit 660 to be operated to the second condition thereof which permits operation of the audio amplifier 470.

If it it desired to use a series of three control tones rather than the series of two control tones described above, the operator at the transmitter 100 makes appropriate adjustments in the tone circuits 200. The receiver 400 must now have the circuit of FIG. 3A therein and the operator must have the switch 590A in contact with the conductor 516A and 599A closed as shown. With the parts so arranged, the tone control circuit 500A operates upon the application of the proper series of control tones thereto to actuate the squelch circuit to the second condition thereof wherein the audio amplifier 470 is operative. It is further pointed out that if additional control tones are desired in the series of control tones, for example four control tones rather than three, the transmitter can be so adjusted. The receiver 400 must be correspondingly modified to add thereto to the circuit of FIG. 3A another series of circuits like the tone filter 504A, the tone switch 550A, transistor circuits 588A and 591A and 558A in the tone output and clamping circuit 570A.

If the operator of the transmitter 100 is unsuccessful in contacting the operator of the receiver 400, the operator of the transmitter 100 will then close the switch (not shown) that will begin operation of the call indicator generator circuit 300, whereby to transmit the call indicator tone of a predetermined frequency, the call indicator tone being transmitted as a series of bursts having predetermined time duration and repetition rate. Having already closed the transmit switch in prior efforts to contact the operator of the receiver 400, the receiver 400 will already have the output amplifier 470 operating and accordingly, will pass the bursts of call indicator tone through the audio output amplifier 480 and the audio output transformer 483 to the call indicator input transformer 801. The total signal appearing on the conductor 808 (see FIG. 5) will first establish a reference potential on the conductor 832; that portion of the signal on the conductor 808 at the frequency of the call indicator tone will be developed on the conductor 812 which will immediately begin operation of the time delay circuit 840. If the call indicator tone persists a length of time to permit the charging of the capacitor 847 in the time delay circuit 840, the transistor 820 will be rendered operative so that if the amplitude of the call indicator tone on the conductor 816 is sufficient to overcome the bias on the conductor 832 an output will appear on the conductor 818 which will be amplified through the now operative transistor 820 and appear on the conductor 825. The signal thus transmitted to the conductor 825 will operate the switching circuit to render the transistor 870 operative thus energizing the light 881 and the call indicator annunciator, the light 881 being, for example, the headlights of a vehicle.

Figure 7:
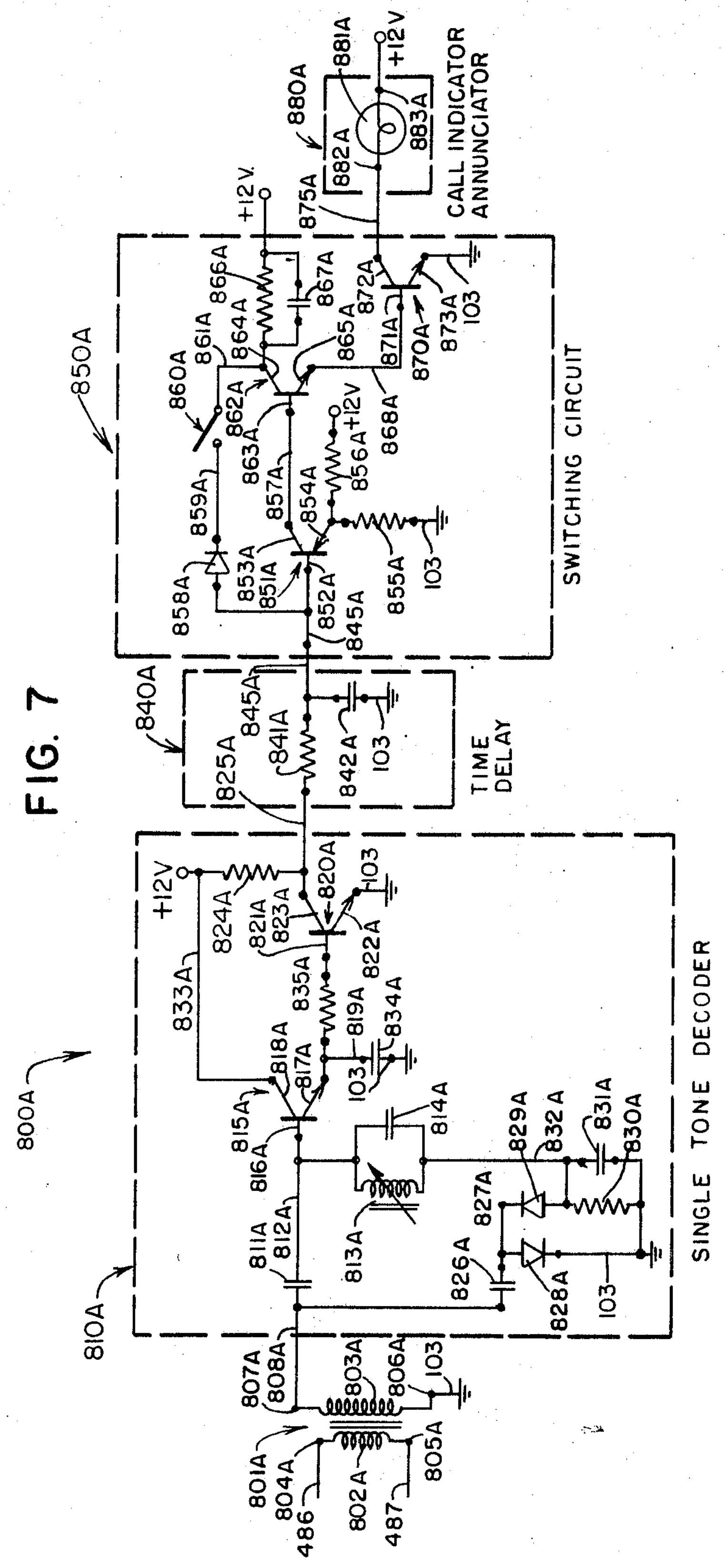
FIG. 7 is a schematic electrical diagram of a call indicator circuit similar to FIG. 5 but showing a first modification thereof.

A modified call indicator system generally indicated by the numeral 800A is illustrated in FIG. 7 of the drawings, parts in FIG. 7 corresponding to parts in FIG. 5 having like numerals applied thereto with the addition of the suffix A. The input to the circuit 800A is from the conductors 486 and 487 connected to the terminals of the audio output transformer 483 (see FIG. 2), which input is applied to a step-up transformer 801A and particularly to the primary winding 802A thereof at the terminals 804A and 805A, respectively. The transformer 801A also has the usual secondary winding 803A that is connected to the grounded conductor 103 and a second terminal 807A connected to a conductor 808A which provides an input to a single tone decoder 810A.

The tone decoder 810A comprises a tone filter network including an input capacitor 811A having one terminal thereof connected to the conductor 808A and having the other terminal thereof connected to the conductor 812A, the conducor 812A connected to a filter circuit including an inductor 813A which is illustrated as being adjustable, and a capacitor 814A arranged in parallel circuit and having one of the common terminals thereof connected to the conductor 812A and having the other common terminals thereof connected to a conductor 832A.

The conductor 812A also connects with a transistor 815A and more specifically with the base 816A thereof.

The emitter 817A of the transistor 815A is connected to a conductor 819A and through a capacitor 834A to the grounded conductor 103. The collector 818A of the transistor 815A is connected by a conductor 833A to a +12 volt supply.

The decoder 810A further comprises a total signal rectifying circuit including an input capacitor 826A having one terminal thereof connected to the input conductor 808A and having the other terminal thereof connected to a conductor 827A. A first diode rectifier 828A is provided having one terminal thereof connected to the conductor 827A and having the other terminal thereof connected to the ground terminal 103 and a second diode rectifier 829A is provided having one terminal thereof connected to the conductor 827A and the other terminal thereof connected through the conductor 832A and a resistor 830A to ground 103, the diodes 828A and 829A being oppositely poled. A filtering capacitor 831A is connected between the conductors 832A and ground across the resistor 830A. A rectified and filtered D.C. potential is provided on the conductor 832A that is proportional to the total signal received on the conductor 808A and serves as a reference voltage.

The transistor 815A is further connected via the conductor 819A and a resistor 835A to an output transistor 820A of the n-p-n type, and more particularly to the base 821A thereof. The emitter 822A of the transistor 820A is connected to the grounded conductor 103, and the collector 823A is connected to an output conductor 825A and via a limiting resistor 824A to a source of +12 volt operating potential. The output of the diode 810A appears on the conductor 825A and is connected to a time delay circuit 840A, the output on the conductor 825A being a sharply negatively going voltage upon the receipt of the proper control tone from the transformer 801A.

The time delay cricuit 840A includes a resistor 841A having one terminal connected to the conductor 825A and having the other terminal connected to a conductor 845A. A capacitor 842A is also connected from the conductor 845A to the grounded conductor 103.

Connected to the conductor 845A is a switching circuit 850A which is in all respect identical to the switching circuit 850 described above, whereby a more full description thereof will not be here given. The output of the switching circuit 850A appears on a conductor 875A that is connected to a call indicator annunciator 880A which is in all respects identical to the call indicator annunciator 880 described above, whereby no further description thereof will be provided here.

In the operation of the call indicator system 800A of FIG. 7, the tone control circuit 500 will typically already have operated to provide an output from the audio amplifier 470, and accordingly, the call indicator tone will be passed through the audio amplifier 470, the audio output amplifier 480 and the audio output transformer 483 to the call indicator input transformer 801A. The appearance of the required tone in the input transformer 801A will cause operation of the rectifying diodes 828A and 829A quickly to produce a D.C. reference potential or bias on the conductor 832A, the value of the reference potential being proportional to the strength of the total signal appearing on the conductor 808A and being negative in value with the circuit components arranged as illustrated. Only the call indicator tone will be passed by the tone filter circuit including the capacitor 811A, the inductor 813A and the capacitor 815A. In order to achieve an output on the conductor 812A, the call indicator tone appearing thereon must have a peak-to-peak value in excess of the bias on the conductor 832A. The peak voltage on the conductor 812A will begin to charge the capacitor 834A through the transistor 815A. The resistor 835A and the capacitor 834A cooperate to provide a filter that produces a smooth D.C. output voltage on the base 821A of the transistor 820A. The transistor 820A has heretofore been essentially non-conducting, whereby there has been a high potential on the output conductor 825A. Upon receipt of the proper tone, the transistor 820A becomes heavily conducting, thereby sharply to lower the potential on the output conductor 825A. The capacitor 942A in the time delay circuit 840A will now begin to discharge through the resistor 841A, whereby after a predetermined time delay determined by the RC constant of the elements 841A–842A to lower the potential on the conductor 845A so as to operate the switching circuit 850A, all as described herein above.

Figure 8:
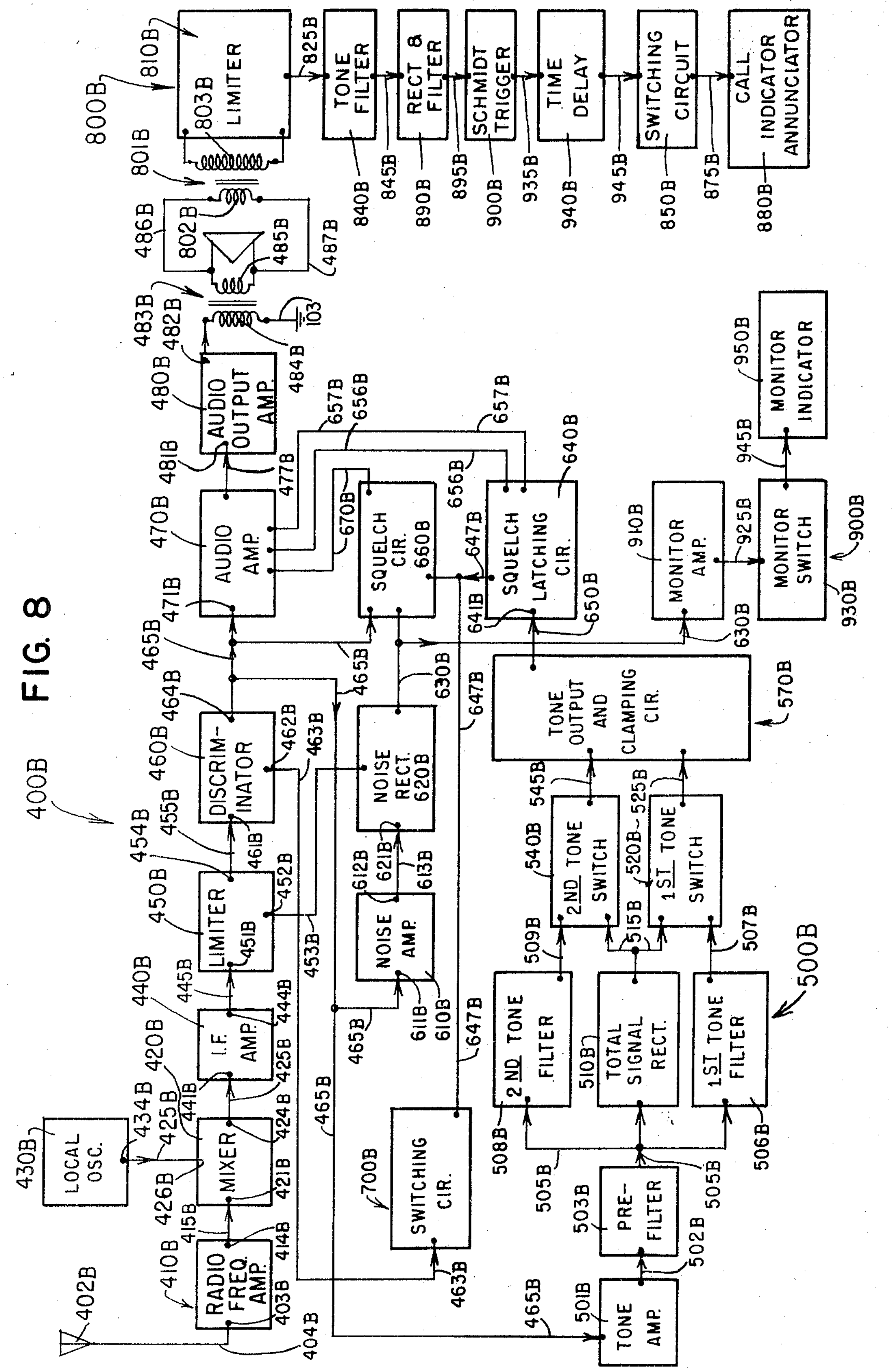
FIG. 8 is a block diagram of a modification of the receiver similar to FIG. 2.

There is illustrated in FIG. 8 of the drawings, a further modification of the receiver, the receiver being designated by the numeral 400B, the receiver 400B of FIG. 8 being similar to the receiver 400 of FIG. 2, whereby the parts in FIG. 8 corresponding to parts in FIG. 2 have had the same numbers applied thereto with the addition of the suffix B. The receiver 400B differs from the receiver 400 essentially in the call indicator system 800B disposed to the right in FIG. 8. The input to the circuit 800B is from the conductors 486B and 487B connected to the terminals of the audio output transformer 483B, which input is applied to a step-up transformer 801B and particularly to the primary winding 802B thereof, the output being from a secondary winding 803B. The secondary winding 803B is connected to a limiter 801B, the output of which is connected by a conductor 825B to the input of a tone filter 840B. The output of the tone filter 840B appears on a conductor 845B and provides an input to a rectifier and filter circuit 890B, the output of which appears on a conductor 895B. The output from the circuit 890B is provided as an input to a Schmidt trigger circuit 900B, the output of which appears on a conductor 935B as an input to a time delay circuit 940B. The output from the circuit 940B appears on a circuit 945B which is applied as an input to a switching circuit 850B, the output of which is provided by a conductor 875B to a call indicator annunciator 880B.

The details of the call indicator system 800B are set forth in FIG. 9, wherein it will be seen that the secondary winding 803B is provided with one terminal 806B which is connected to the base of a first transistor 811B and a second terminal 807B that is connected via a conductor 808B to the base of a second transistor 820B. The transistor 811B more particularly has a base 812B connected to the terminal 806B, an emitter 813B connected to a conductor 816B and a collector 814B connected via a conductor 815B to a source of +12 volt potential. The second transistor 820B has a base 821B connected to the conductor 808B, an emitter 822 connected to the conductor 816B and a collector 823B connected to the conductor 825B and through a limiting resistor 824B to the +12 volt potential. The condductor 808B is connected via a resistor 826B and the conductor 827B is a +12 volt supply, and a potentiometer 828B is connected between the conductor 827B and the grounded conductor 103. The movable contact 829B on the potentiometer 828B is connected to the base of a transistor 830B, the transistor 830B more specifically having a base 831B connected to the contact 829B, an emitter 832B connected via a resistor 833B to the grounded conductor 103, and a collector 834B connected to the conductor 816B.

The output from the limiter circuit 810B is applied via the conductor 825B as the input to the tone filter 840B, The tone filter 840B includes a capacitor 841B having one terminal connected to the conductor 825B and the other terminal connected to a conductor 845B. Also connected to the conductor 845B are connected terminals of an inductor 842B and a capacitor 843B, the other terminals thereof being connected together to the grounded conductor 103.

The output from the tone 840B appears on the conductor 845B and is applied as an input to the rectifier and filter 890B, specifically to one terminal of the rectifying diode 891B forming a part thereof. The other terminal of the diode 891B is connected to a conductor 892B and to one terminal of a resistor 893B and one terminal of a capacitor 894B, the other terminal of the capacitor 894B being connected to the grounded conductor 103, and the other terminal of the resistor 893B being connected to the conductor 895B.

The potential on the conductor 895B is applied as an input to the Schmidt trigger circuit 900B, specifically to the input transistor 901B thereof. The transistor 901B has a base 902B to which is connected the conductor 895B, an emitter 903B connected to a conductor 905B and a collector 904B connected to a conductor 935B and through a resistor 906B to a conductor 907B to which is applied the +12 volt potential. The circuit 900B includes a second transistor 910B having a base 911B connected to a conductor 914B, the conductor 914B being connected through a first resistor 915B to the grounded conductor 103 and through a second resistor 916B to the output conductor 935B. The emitter 912 of the transistor 910B is connected to the conductor 905B and the collector 913B is connected via a conductor 917B, a resistor 918B and the conductor 907B to the +12 volt potential. There further is provided in circuit 900B a third transistor 920B having a base 921B, an emitter 922B connected via a resistor 924B to the grounded conductor 103, and a collector 923B connected to the conductor 905B. A fixed D.C. bias circuit is also provided including a Zener diode 930B having one terminal connected via a conductor 931B and a resistor 932B to the +12 volt supply, and having the other terminal connected to the grounded conductor 103. Disposed in parallel with the Zener diode 930B is a capacitor 933 B and a potentiometer 936B, the potentiometer 936B having a movable contact 937B connected to the base 921B of the transistor 920B.

The output from the Schmidt trigger circuit 900B is applied along the conductor 935B as an input to the time delay circuit 940B. The circuit 940B includes a resistor 941B connected between the conductor 935B and a conductor 945B. There also is connected between the conductor 945B and the grounded conductor 103 a capacitor 942B.

The output from the time delay circuit 940B appears on the conductor 945B and is applied as the input to the switching circuit 850B. The switching circuit 850B is in all respects identical to the switching circuit 850 described above, whereby a more full description thereof will not be here given. The output of the switching circuit 850B appears on a conductor 875B that is connected to a call indicator annunciator 880B which is in all respects identical to the call indicator annunciator 880 described above, whereby no further description thereof will be set forth here.

In the operation of the call indicator system 800B of FIG. 9, the tone control circuit 500B typically already has operated to provide an output from the audio amplifier 470B, and accordingly, the call indicator tone will be passed through the audio amplifier 470B, the audio output amplifier 480B and the audio output transformer 483B to the call indicator input transformer 801B. The transistors 811B and 820B provide in essence a differential amplifier, the total current that can flow through the transistors 811B and 820B being that which flows through the transistor 830B which is in turn controlled by the setting of the potentiometer 828B. The potentiometer 828B is adjusted so that the current through the transistor 830B is not sufficient to allow one of the transistors 811B–820B to be driven to saturation when the other is non-conducting. The incoming call tone on the terminals 806B and 807B alternately increases the conduction of one of the transistors 811B–820B and decreases to cut-off the conduction of the other, the conduction through the conducting transistor 811B–820B being limited by the conduction through the transistor 830B. Therefore the output on the conductor 825B is a square wave whenever the amplitude of the incoming audio signal is more than a certain minimum determined by the gain of the limiter 810B and the adjustment of the limiting level by the potentiometer 828B. Assuming that the amplitude of the call tone appearing at the input of the limiter 810B is sufficent to cause limiting, a square wave output is provided on the conductor 825B. It is pointed out that once the limiter 810B operates, the filter control band width will be constant if the limiter is symmetrical, i.e., if the circuits for the transistors 811B and 820B are balanced and symmetrical. An important feature of the limiter 810B resides in the fact that with a carefully controlled D.C. bias potential on the conductor 827B, there is no change of the band width as a result of a change in the amplitude of the incoming tone control signal, since above limiting, the voltage level to the output tone filter 840B will be constant. When the amplitude of the incoming signal is below the limiting level, the band width will narrow; however, this narrowing portion will be very small. By adjusting the limiting level of the limiting amplifier 810B by means of the slider 829B, the maximum band width can be easily adjusted.

A series of square wave pulses on the conductor 825B are then applied to the tone filter 840B, and assuming that incoming tone has the frequency to which the filter 840B is tuned, the output on the conductor 845B will be a sinusoidal wave having a frequency equal to that of the call control tone. The sinusoidal wave on the conductor 845B is applied as an input to the rectifier and filter 890B, and there appears as the output therefrom a positive going voltage on the conductor 895B that is applied as an input to the Schmidt trigger circuit 900B.

Before the application of the input along the conductor 895B to the Schmidt trigger circuit 900B, the bias transistor 920B is conducting to establish a bias on the emitters of the transistors 901B and 910B, the amount of bias being adjustable by means of the potentiometer 936B, whereby the potentiometer 936B serves as the band width adjustment for the call control tone. Initially, the transistor 901B is non-conducting and the transistor 910B is conducting. Upon the application of the positive voltage along the conductor 895B to the base of the transistor 901B, the transistor 901B begins to conduct and quickly drives the transistor 910B to a non-conducting condition, the potential on the conductor 935B is applied to the base of the transistor 910B rapidly dropping. After a suitable time delay as determined by the time constant characteristics provided by the capacitor 942B and the resistor 941B in the time delay circuit 940B, a negative going voltage will appear on the conductor 945B so as to operate the switching circuit 850B, all as described above with respect to circuit 850B.

Figure 10:
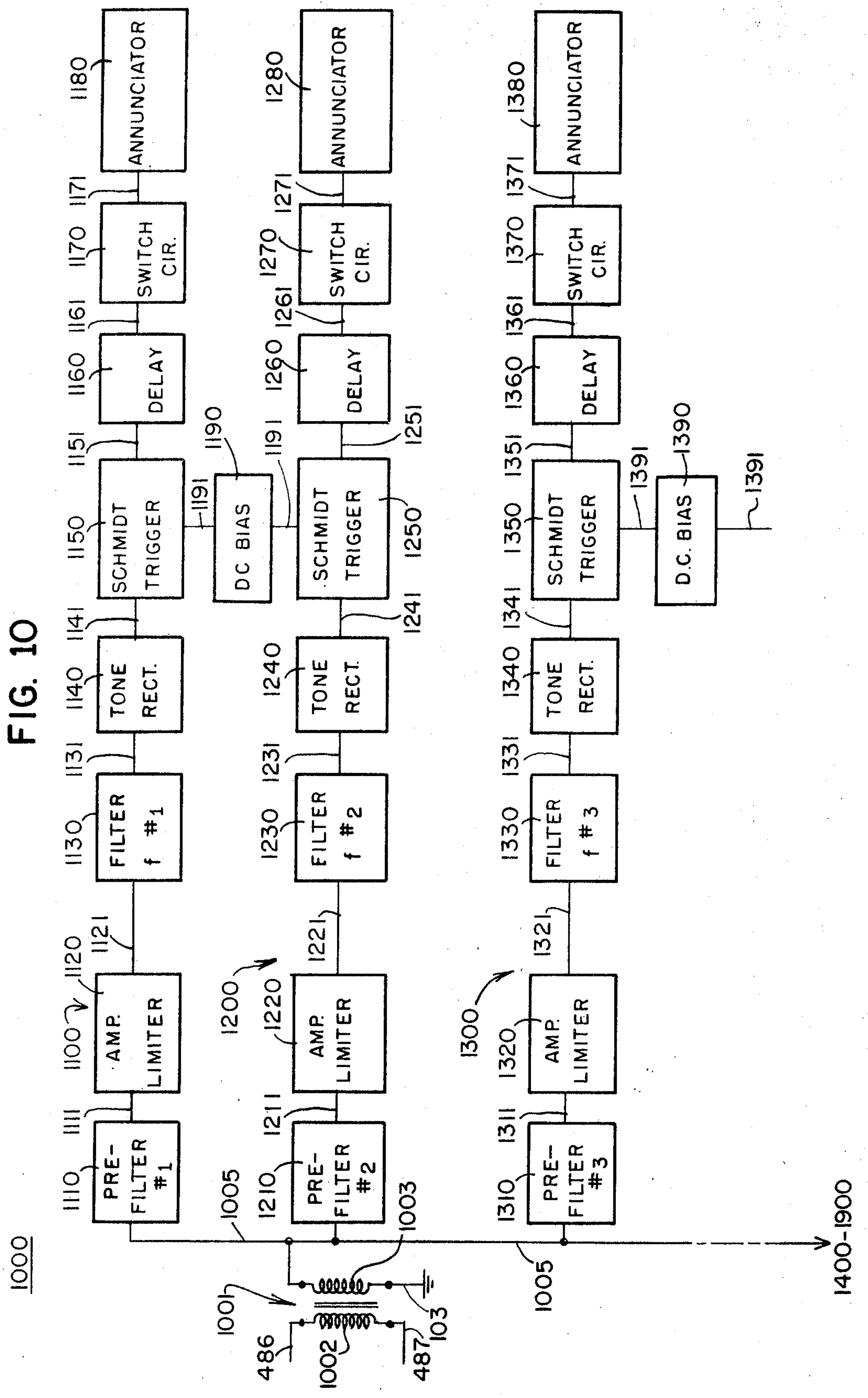
FIG. 10 is a block diagram illustrating the manner in which a plurality of the call indicator circuits of FIG. 9 may be incorporated in a single system.

There is illustrated in FIG. 10 of the drawings a modification of the receiver wherein a plurality of annunciators are to be simultaneously or selectively actuated by control tone signals, the control tone signals arriving individually or simultaneously or sequentially at the input to the receiver, depending upon the control functions to be accomplished. As illustrated, the output conductors 486 and 487 from the audio output transformer 483 are connected to provide an input to an input transformer 1001, the transformer 1001 including a primary winding 1002 and a secondary winding 1003. The conductors 486 and 487 are respectively connected to the terminal of the primary winding 1002, while one of the terminals of the secondary winding 1003 is connected to the grounded conductor 103 and the other terminal is connected to an output conductor 1005.

Three tone control channels 1100, 1200 and 1300 have been illustrated in FIG. 10, but it will be understood that any desired number of such tone control channels may be connected to the input conductor 1005, this being diagrammatically illustrated by the dashed line beneath which appears the numerals 1400–1900. Turning first to the tone control channel or decoder 1100, it will be seen that it includes a pre-filter 1110 having the input thereof connected to the input conductor 1005 and having the output thereof connected by a conductor 1111 as the input to an amplifier-limiter 1120. The amplifier-limiter 1100 is of the construction and arrangement of the circuit 810B discussed above with respect to FIG. 9.

The output from the limiter 1120 appears on a conductor 1121 and is applied as an input to a filter 1130, the filter 1130 having the construction of the filter 840B described above with respect to FIG. 9. The output from the filter 1130 appears on the conductor 1131 and is applied as the input to a rectifier 1140 of the same construction and arrangement as the rectifier 890B of FIG. 9. Connected to the rectifier 1140 by a conductor 1141 is a Schmidt trigger circuit 1150 having associated therewith a D.C. bias circuit 1190, these circuits being of the arrangement and construction of the circuit 900B of FIG. 9. One bias circuit can supply bias to one or more Schmidt triggers circuit as shown. The output from the Schmidt trigger circuit 1150 appears on a conductor 1151 and is applied through a delay circuit 1160 and a conductor 1161 to a switching circuit 1170, and from the switching circuit 1170 along a conductor 1171 to the annunciator 1180. The delay circuit 1160 has the construction and arrangement of the delay circuit 940B, the switching circuit 1170 has the construction and arrangement of the switching circuit 850B, and the annunciator 1180 has the construction of the annunciator 880B, all described in detail in conjunction with FIG. 9.

Each of the tone control channels or decoders 1100, 1200, 1300 . . . 1900, etc., are constructed and arranged like the tone control circuit and decoder 1100 described above, whereby in the interest of brevity, these additional decoders will not be further described in detail. It is pointed out, however, that when two or more tone control signals are to be applied simultaneously to the input conductor 1005, the pre-filters 1110, 1210, 1310 . . . 1910, etc., are required if following each is to be an amplifier-limiter 1120, etc. The limiter 1120, for example, will tend to sort out the strongest tone control signal received and respond to that signal, rather than the one to which the filter 1130 is tuned, this being analogous to the well known F.M. "capture effect." The provision of the pre-filters causes the associated limiter always to respond only to the signal to which its associated filter 1130, etc., is tuned so that the tone control channel or decoder responds only to the desired control tone, regardless of the amplitude of the several control tones that may be received simultaneously upon the input conductor 1005.

Figure 11:
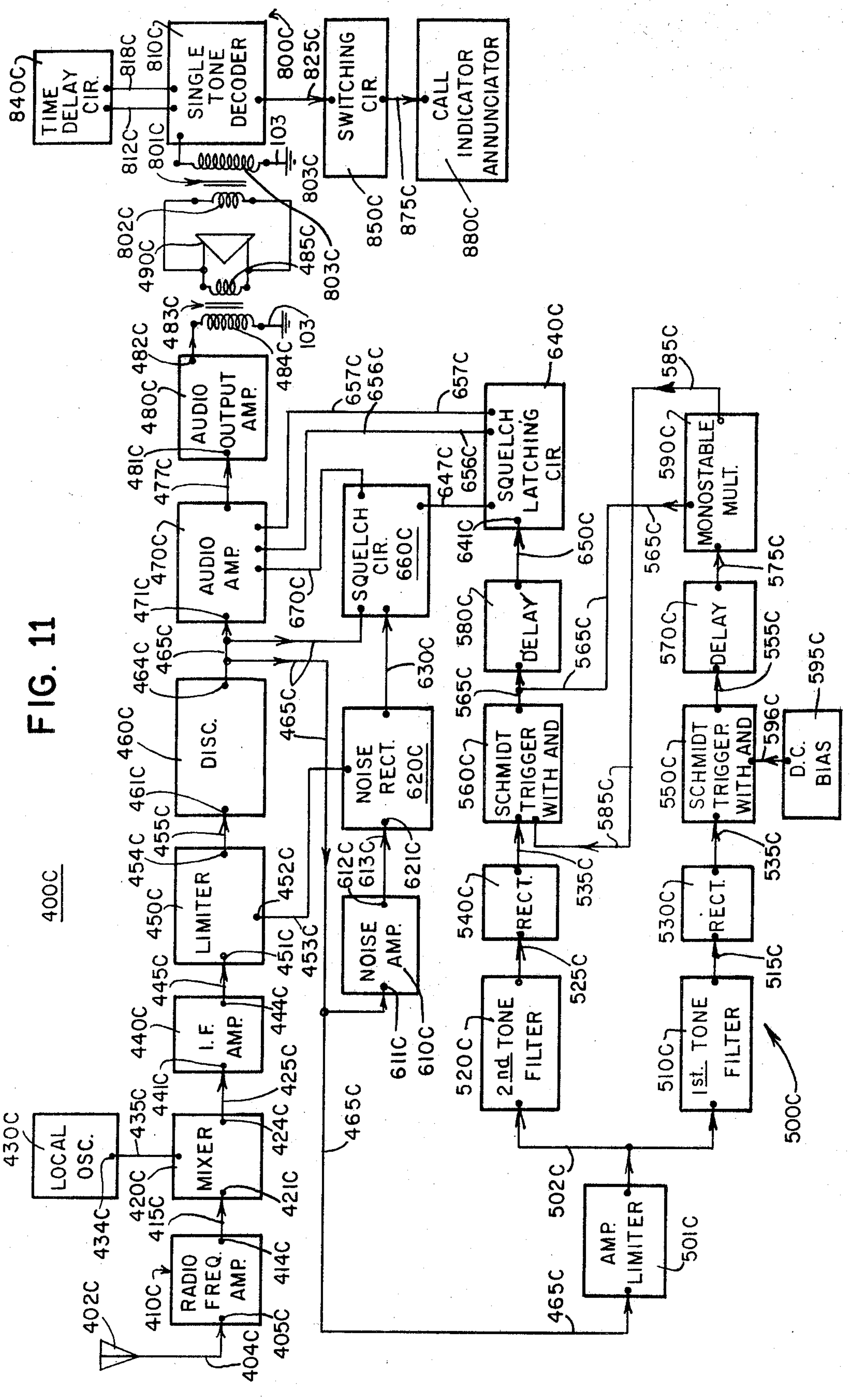
FIG. 11 is a block diagram of the receiver similar to that of FIG. 2 but illustrating the incorporation therein of a modification of the tone decoder utilizing certain of the circuits of FIG. 9.

There is illustrated in FIG. 11 of the drawings yet another form of receiver designated by the numeral 400C which is generally like the receiver 400 illustrated in FIG. 2, but with substitutes for the tone control circuits 500 in FIG. 2 a new tone control circuit or decoder 500C. Where appropriate, the parts in FIG. 11 corresponding to parts in FIG. 2 have like numerals applied thereto with the addition of the suffix C.

The tone control circuit 500C is adapted to respond to a predetermined sequence of two predetermined tones. Referring to the lower portion of FIG. 11, the audio signal including the control tone sequence from the discriminator 460C appearing on the conductor 465C is applied as an input to an amplifier-limiter 501C of the same general construction and arrangement as the limiter 810B in FIG. 9. The output from the amplifier-limiter 501C appears on a conductor 502C and is applied to two substantially identical decoder channels. The lower decoder channel includes a 1st tone filter 510C having the construction of the general filter 840B in FIG. 9, the output appearing on a conductor 515C connected to a rectifier 530C having the construction of the rectifier 890B of FIG. 9. The rectified output from the rectifier 530C is applied to a Schmidt trigger circuit 550C having associated therewith a D.C. bias 595C connected thereto by a conductor 596C, these elements having essentially the construction of the Schmidt trigger circuit 900B of FIG. 9. The output from the circuit 550C appears on a conductor 555C and is applied by a delay circuit 570C and a conductor 575C as the input to a monostable multivibrator 590C. The delay circuit 570C may have the construction and arrangement of the delay circuit 940B of FIG. 9.

The 2nd and upper tone conductor channel is also connected to the conductor 502C and includes a 2nd tone filter 520C connected by a conductor 525C to a rectifier 540C that is connected by a conductor 535C to a Schmidt trigger circuit 560C that is connected by a conductor 565C to a delay circuit 580C that is connected by a conductor 650C to the input terminal 641C of a squelch latching circuit 640C. The filter 520C has the construction of the filter 840B, the rectifier 540C has the construction of the rectifier 890B, the Schmidt trigger circuit 560C has essentially the construction of the Schmidt trigger circuit 990B and the delay circuit 580C has the construction of the delay circuit 940B. In addition, there is a connection via the conductor 565C to the monostable multivibrator and a connection via the conductor 585C between the Schmidt trigger circuit 560C and the monostable multivibrator 590C. The construction of the monostable multivibrator and the last mentioned connections are all described in detail in the co-pending application of Keith H. Wycoff, Ser. No. 666,645, filed Sept. 11, 1967 for Selective Communication System and Components Thereof. More specifically, a circuit like the decoder circuit 500C including those parts and connections between the conductor 465C and the conductor 650C in FIG. 11 are fully illustrated and described in conjunction with FIGS. 3, 4 and 5 of the aforementioned application Ser. No. 666,645, the description and further details thereof being incorporated herein by reference.

In the operation of the decoder 500C of FIG. 11, assuming that the proper sequence of the proper control tones appears on the conductor 465C, the first control tone will be amplified and limited by the circuit 501C to provide a series of square waves on the conductor 502C which will be applied to the filters 510C and 520C. Assuming that the first control tone received is that to which the filter 510C is tuned, there will be a sine wave output having the frequency of the first control tone on the conductor 515C. The sine wave on the conductor 515C will be rectified by the circuit 530C and will apply a positive going potential along the conductor 535C as an input to the Schmidt trigger circuit 550C. The Schmidt trigger circuit 550C will be actuated thus to cause a negative going signal on the conductor 555C, and assuming that the first control tone persists for a time interval such as to overcome the delay of the circuit 570C, then a signal will be applied to the monostable multivibrator 590C. Upon the cessation of the first control tone, the multivibrator 590C will apply a signal along the conductor 585C that will prepare the Schmidt trigger circuit 560C for the reception of the second control tone.

Assuming now that the second control tone is applied to the limiter 501C, a square wave output will be applied on the conductor 502C, and since it has therein a component to which the filter 520C is tuned, a sine wave output is applied to the conductor 525C that is rectified by the circuit 540C and applied as a second input to the Schmidt trigger circuit 560C. Assuming that the proper signal is being applied along the conductor 585C as a result of the reception, adequate persistence and subsequent cessation of the first control tone, then an output is obtained on the conductor 565C, this output being applied to the delay circuit 580C and also fed back to the multivibrator 590C to maintain it in the triggered condition. Assuming that the second control tone persists for a time period adequate to satisfy the delay of the circuit 580C, then an output from the conductor 500C is provided on the conductor 650C which when applied through the squelch latching circuit 640C is effective to render the audio amplifier 470C operative, and thus to energize the subsequent audio output circuits.

Although there have been illustrated and described certain preferred embodiments of the invention, it is to be understood that various changes and modifications can be made therein without departing from the spirit and scope of the invention, and it is intended that all such changes and modifications be covered as fall within the scope of the appended claims.

What is claimed is:

1. A tone control circuit for use in a communication receiver including an input circuit adapted to have both a control tone of finite duration and noise therein, said control circuit comprising a reference circuit for producing a reference signal, a control tone filter having an input coupled to the input circuit and being responsive to the application thereto of the control tone and the noise for producing at the output thereof a first control signal proportional in amplitude only to the amplitude of the control tone, a control tone rectifier having a first input coupled to the output of said control tone filter and having a second input coupled to said reference circuit, said control tone rectifier being responsive to the application thereto of a first control signal having an amplitude exceeding the amplitude of the reference signal for producing at the output thereof an output control signal of a finite duration proportioned to the finite duration of the control tone, a tone output circuit including an electronic switch having an input coupled to said control tone rectifier and a reactance means having an input coupled to the output of said switch, said tone output circuit being operative to produce a first output pulse of one polarity upon commencement of said output control signal and a second output pulse of an opposite polarity upon termination of said output control signal, and a utilization circuit coupled to the output of said reactance means and being unresponsive to said first pulse and being responsive to said second pulse.

2. A tone control circuit for use in a communication receiver including an input circuit adapted to have both a control tone of finite duration and noise therein, said control circuit comprising a reference circuit for producing a reference signal, a control tone filter having an input coupled to the input circuit and being responsive to the application thereto of the control tone and the noise for producing at the output thereof a first control signal proportional in amplitude only to the control tone, a control tone rectifier having a first input coupled to the output of said control tone filter and having a second input coupled to said reference circuit, said control tone rectifier being responsive to the application thereto of a first control signal having an amplitude exceeding the amplitude of the reference signal for producing at the output thereof an output control signal of a finite duration proportioned to the finite duration of the control tone, a time delay circuit coupled to said control tone rectifier and having a predetermined time delay, a tone output circuit including an electronic switch having an input coupled to said control tone rectifier and a reactance means having an input coupled to the output of said switch, said tone output circuit being operative to produce a first output pulse of one polarity upon commencement of said output control signal and a second output pulse of an opposite polarity upon termination of said output control signal, a utilization circuit coupled to the output of said reactance means and being unresponsive to said first pulse and being responsive to said second pulse.

3. A tone control circuit for use in a communication receiver including an input circuit adapted to have a demodulated signal including a control tone therein and an output circuit, said tone control circuit comprising a first rectifying circuit having an input coupled to the input circuit and being responsive to the application thereto of the demodulated signal for producing at the front thereof a first control signal proportional in amplitude to the amplitude of the demodulated signal, a control tone filter having an input coupled to the input circuit and being responsive to the application thereto of the demodulated signal for producing at the output thereof a second control signal proportional in amplitude only to the amplitude of the control tone, and a second rectifying circuit having a first input coupled to the output of said control tone filter and having a second input coupled to the output of said first rectifying circuit and having an output coupled to the output circuit of said tone control circuit, said second rectifying circuit being poled to provide an output therefrom only when the amplitude of said second control signal exceeds the amplitude of said first control signal.

4. A tone control circuit for use in a communication receiver including an input circuit adapted to have a sequence of a plurality of control tones each of finite duration and noise therein, said control circuit comprising a reference circuit for producing a reference signal, a plurality of control tone filters corresponding in number to the plurality of control tones and each tuned to one of the control tones, each of said control tone filters having an input coupled to the input circuit and being responsive to the application thereto of the control tones and the noise for producing at the output thereof a control signal proportional in amplitude only to the control tone to which the filter is tuned, a plurality of control tone rectifiers corresponding in number to said control tone filters and each having a first input coupled to the output of the corresponding one of said control tone filters and having a second input coupled to said reference circuit, each of said control tone rectifiers being responsive to the application thereto of the corresponding control signal having an amplitude exceeding the amplitude of the reference signal for producing at the output thereof an output control signal of a finite duration proportional to the finite duration of the corresponding one of the control tones, and a plurality of tone output circuits corresponding in number to said control tone rectifiers, each of said tone output circuits having an input coupled to the output of the corresponding one of said control tone rectifiers for receiving the corresponding output control signal, the tone output circuit corresponding to the first control tone in the sequence of control tones being responsive to the termination of the corresponding output control signal for producing at the output thereof an output pulse, the tone output circuits corresponding to the second and subsequent control tones in the sequence of control tones each having a second input coupled to the output of the tone output circuit corresponding to the control tone next preceding the corresponding control tone in the sequence of control tones, the tone output circuits corresponding to the second and subsequent control tones in the sequence of control tones each being responsive to the application thereto of the output pulse from the tone output circuit corresponding to the next preceding control tone in the sequence of control tones and the subsequent termination of the corresponding output control signal from the corresponding control tone rectifier for producing at the output thereof an output pulse for the tone output circuit corresponding to the next succeeding control tone in the sequence of control tones, said tone output circuit corresponding to the final control tone in the sequence of control tones having the output thereof connected as the output from said tone control circuit.

5. A tone control circuit for use in a communication receiver including an input circuit adapted to have a sequence of first and second control tones each of finite duration and noise therein, said control circuit comprising a reference circuit for producing a reference signal, a first control tone filter having an input coupled to the input circuit and being responsive to the application thereto of the first control tone and the noise for producing at the output thereof a first control signal proportional only to the first control tone, a first control tone rectifier having a first input coupled to the output of said first control tone filter and having a second input coupled to said reference circuit, said first control tone rectifier being responsive to the application thereto of a first control signal hoving an amplitude exceeding the amplitude of the reference signal for producing at the output thereof a first output control signal of a finite duration proportional to the finite duration of the first duration of the first control tone, a first tone output circuit having an input coupled to the output of said first control tone rectifier for receiving the first output control signal, said first tone output circuit being responsive to the termination of the first output control signal for producing at the output thereof a first output pulse, a second control tone filter having an input couple to the input circuit and being responsive to the application thereto of the second control tone and the noise for producing at the output thereof a second control signal proportional only to the second control tone, a second control tone rectifier having a first input coupled to the output of said second control tone filter and a second input coupled to said reference circuit, said second control tone rectifier being responsive to the application thereto of the second control signal having an amplitude exceeding the amplitude of the reference signal for producing at the output thereof a second output control signal of a finite duration proportional to the finite duration of the second control tone, and a second tone output circuit having a first input coupled to the output of said second control tone rectifier for receiving the second output control signal and having a second input coupled to the output of said first tone output circuit for receiving the first output pulse, said second tone output circuit being responsive to the application thereto of the first output pulse and the subsequent termination of the second output control signal for producing at the output thereof a control pulse.

6. A tone control circuit for use in a communication receiver including an input circuit adapted to have a sequence of first and second and third control tones each of finite duration and noise therein, said control circuit comprising a reference circuit for producing a reference signal, a first control tone filter having an input coupled to the input circuit and being responsive to the application thereto of the first control tone and the noise for producing at the output thereof a first control signal proportional only to the first control tone, a first control tone rectifier having a first input coupled to the output of said first control tone filter and having a second input coupled to said reference circuit, and first control tone rectifier being responsive to the application thereto of a first control signal having an amplitude exceeding the amplitude of the reference signal for producing at the output thereof a first output control signal of a finite duration proportional to the finite duration of the first control tone, a first tone output circuit having an input coupled to the output of said first control tone rectifier for receiving the first output control signal, said first tone output circuit being responsive to the termination of the first output control signal for producing at the output thereof a first output pulse, a second control tone filter having an input coupled to the input circuit and being responsive to the application thereto of the second control tone and the noise for producing at the output thereof a second control signal proportional only to the second control tone, a second control tone rectifier having a first input coupled to the output of said second control tone filter and a second input coupled to said reference circuit, said second control tone rectifier being responsive to the application thereto of the second control signal having an amplitude exceeding the amplitude of the reference signal for producing at the output thereof a second output control signal of a finite duration proportional to the finite duration of the second control tone, a second tone output circuit having a first input coupled to the output of said second control tone rectifier for receiving the second output control signal and having a second input coupled to the output of said first tone output circuit for receiving the first output pulse, said second tone output circuit being responsive to the application thereto of the first output pulse and the subsequent termination of the second output control signal for producing at the output thereof a second output pulse, a third control tone filter having an input coupled to the input circuit and being responsive to the application thereto of the third control tone and the noise for producing at the output thereof a third control signal proportional only to the third control tone, a third control tone rectifier having a first input coupled to the output of said third control tone filter and a second input coupled to said reference circuit, said third control tone rectifier being responsive to the application thereto of the third control signal having an amplitude exceeding the amplitude of the reference signal for producing at the output thereof a third output control signal of finite duration proportional to the finite duration of the third control tone, and a third tone output circuit having a first input coupled to the output of said third control tone rectifier for receiving the third output control signal and having a second input coupled to the output of said second tone output circuit for receiving the second output pulse, said third tone output circuit being responsive to the application thereto of the second output pulse and the subsequent termination of the third output control signal for producing at the output thereof a control pulse.

7. A tone circuit for use in a communication receiver including an input circuit adapted to have a sequence of a plurality of control tones each of finite duration and noise therein, said control circuit comprising a reference circuit for producing a reference signal, a plurality of control tone filters corresponding in number to the plurality of control tones and each tuned to one of the control tones, each of said control tone filters having an input coupled to the input circuit and being responsive to the application thereto of the control tones and the noise for producing at the output thereof a control signal proportional in amplitude only to the control tone to which the filter is tuned, a plurality of control tone rectifiers corresponding in number to said control tone filters and each having a first input coupled to the output of the corresponding one of said control tone filters and having a second input coupled to said reference circuit, each of said control tone rectifiers being responsive to the application thereto of the corresponding control signal having an amplitude exceeding the amplitude of the reference signal for producing at the output thereof an output control signal of a finite duration proportional to the finite duration of the corresponding one of the control tones, a plurality of tone output circuits corresponding in number to said control tone rectifiers, each of said tone output circuits having an input coupled to the output of the corresponding one of said control tone rectifiers for receiving the corresponding output control signal, and a plurality of time delay circuits corresponding in number to said control tone rectifiers and respectively coupled to the corresponding control tone rectifiers and to the corresponding tone output circuits and each having a predetermined time delay, the tone output circuit corresponding to the first control tone in the sequence of control tones being responsive to the application thereto of the corresponding output control signal having a finite duration at least equal to the predetermined time delay of the corresponding time delay circuit for producing at the output thereof an output pulse, the tone output circuits corresponding to the second and subsequent control tones in the sequence of control tones each having a second input coupled to the output of the tone output circuit corresponding to the control tone next preceding the corresponding control tone in the sequence of control tones, the tone output circuits corresponding to the second and subsequent control tones in the sequence of control tones each being responsive to the application thereto of the output pulse from the tone output circuit corresponding to the next preceding control tone in the sequence of control tones and being responsive to the application thereto of corresponding output signals having finite durations at least equal to the predetermined time delays of the corresponding time delay circuits for producing at the output thereof an output pulse for the tone output circuit corresponding to the next succeeding control tone in the sequence of control tones, said tone output circuit corresponding to the final control tone in the sequence of control tones having the output thereof connected as the output from said tone control circuit.

8. A tone control circuit for use in a communication receiver including an input circuit adapted to have a plurality of demodulated control tones simultaneously applied thereto, said control circuit comprising a reference circuit for producing a fixed D.C. bias, a plurality of pre-filters corresponding in number to the plurality of control tones and each tuned to one of the control tones, each of said pre-filters having an input coupled to said input circuit and being responsive to the application thereto of the simultaneous control tones for producing at the output thereof a first control signal proportional only to the control tone to which said pre-filter is tuned, a plurality of limiter circuits corresponding in number to said pre-filters, each of said limiter circuits having an input coupled to the output of the corresponding one of said pre-filters and being responsive to the application thereto of the corresponding first control signal for producing at the output thereof a second control signal, a plurality of control tone filters corresponding in number to the plurality of limiter circuits and each tuned to one of the control tones, each of said control tone filters having an input coupled to the corresponding one of said limiter circuits and being responsive to the application thereto of the corresponding second control signal for producing at the output thereof a third control signal, a plurality of control tone rectifiers corresponding in number to said control tone filters, each of said control tone rectifiers having an input coupled to the output of the corresponding one of said control tone filters and being responsive to the application thereto of the corresponding third control signal for producing at the output thereof a fourth control signal and a plurality of trigger circuits corresponding in number to said control tone rectifiers and each having a first input coupled to said reference circuit, each of said trigger circuits having a second input coupled to the output of the corresponding one of said control tone rectifiers and being responsive to the application thereto of the corresponding fourth control signal for producing at the output thereof a fifth control signal.

9. A tone control circuit for use in a communication receiver including an input circuit adapted to have a demodulated signal including a control tone therein and an output circuit, said tone control circuit comprising a reference circuit having an input coupled to the input circuit and being responsive to the application thereto of the demodulated signal for producing at the output thereof a first control signal proportional in amplitude to the amplitude of the demodulated signal, a control tone filter having an input coupled to the input circuit and being responsive to the application thereto of the demodulated signal for producing at the output thereof a second control signal substantially proportional in amplitude only to the amplitude of the demodulated control tone, and a tone output circuit having a first input coupled to the output of said control tone filter and having a second input coupled to the output of said reference circuit and operative to provide an output signal for said output circuit only when the amplitude of said second control signal exceeds the amplitude of said first control signal.

10. A tone control circuit for use in a communication receiver including an input circuit adapted to have a demodulated signal including a series of control tones therein and an output circuit, said tone control circuit comprising a reference circuit having an input coupled to the input circuit and being responsive to the application thereto of the demodulated signal for producing at the output thereof a reference signal proportional in amplitude to the amplitude of the demodulated signal, a plurality of electrical filters corresponding in number to the control tones and coupled to the input circuit and each being operative to produce an output only in response to a control tone lying within a band of frequencies containing the frequency of the control tone to which the associated filter is tuned, a plurality of tone output circuits corresponding in number to said electrical filters and each having an input coupled to the associated one of said electrical filters and each having an output, the first of said tone output circuits having the output thereof coupled to said tone output circuit and the second and each succeeding tone output circuit having the output thereof coupled to the next succeeding one of said tone output circuits, said first tone output circuit being responsive to the application thereto of the first control tone for producing at the output thereof a gating pulse occurring at least partly during the initial portion of the second control tone and having a duration substantially shorter than the duration of the second control tone, the second and each succeeding one of said tone output circuits being normally inoperative and being rendered operative by the application thereto of the gating pulse from the next preceding tone output circuit and being responsive to the associated control tone received while the associated tone output circuit is operative to produce at the output thereof a gating pulse occurring at least partly during the initial portion of the associated control tone and having a duration substantially shorter than the associated control tone, the last of the tone output circuits being rendered operative by the application thereto of the gating pulse from the next preceding tone output circuit and being responsive to the last control tone received while said last control tone circuit is operative to produce at the output thereof an output signal, said tone output circuits being coupled to said reference circuit and operative respectively to produce gating and output pulses only when the amplitude of the output of the associated filter exceeds the amplitude of said reference signal, said reference signal having a valve to cause each of said gating and output pulses to be produced only in response to a control tone having a frequency lying within a band of frequencies narrower than the band of frequencies passed by the associated electrical filter, and means coupling said output signal to the output circuit.

11. A tone control circuit for use in a communication receiver including an input circuit adapted to have a series of control tones therein, said tone control circuit comprisig a plurality of filters corresponding in number to the control tones and coupled to the input circuit and each being operative to produce an output in response to control tone having a frequency lying within a band of frequencies containing the frequency of the control tone to which the associated filter is tuned, a plurality of tone output circuits corresponding in number to said filters and each having an input coupled to the associated one of said electrical filters and each having an output, the first of said tone output circuits having the output thereof coupled to said second tone output circuit and the second and each succeeding tone output circuit having the output thereof coupled to the next succeeding one of said tone output circuits, said first tone output circuit being responsive to the application thereto of the first control tone and the subsequent removal thereof for producing at the output thereof a gating pulse occurring on termination of the first control tone, the second and each succeeding one of said tone output circuits being normally inoperative and being rendered operative by the application thereto of the gating pulse from the next preceding tone output circuit and being responsive to the associated control tone received while the associated tone output circuit is operative and the subsequent removal of the associated control tone to produce at the output thereof a gating pulse occurring upon termination of the associated control tone, the last of the tone output circuits being rendered operative by the application thereto of the gating pulse from the next preceding tone output circuit and being responsive to the last control tone received while the last control tone circuit is operative and to the subsequent removal of the last control tone to produce at the output thereof an output signal occurring upon termination of the last control tone, and means coupling said output signal to said output circuit.

12. A tone control circuit for use in a communication receiver including an input circuit adapted to have a series of control tones therein, said tone control circuit comprisig a plurality of filters corresponding in number to the control tones and coupled to the input circuit and each being operative to produce an output in response to a control tone having a frequency to which the associated filter is tuned, a plurality of tone output circuits corresponding in number to the contol tones and each having an input coupled to the associated one of said electrical filters and each having an output, the first of said tone output circuits having the output thereof coupled to said second tone output circuit and the second and each succeeding tone output circuit having the output thereof coupled to the next succeeding one of said tone output circuits, said first tone output circuit being responsive to the application thereto of the first control tone for producing at the output thereof a gating pulse occurring at least partly during the initial portion of the second control tone and having a duration substantially shorter than the duration of the second control tone, the second and each succeeding one of said tone output circuits being normally inoperative and being rendered operative by the application thereto of the gating pulse from the next preceding tone output circuit and being responsive to the associated control tone received while the associated tone output circuit is operative to produce at the output thereof a gating pulse occurring at least partly during the initial portion of the associated control tone, the last of the tone output circuits being rendered operative by the application thereto of the gating pulse from the next preceding tone output circuit and being responsive to the last control tone received while said last control tone circuit is operative to produce at the output thereof an output signal, means responsive to the gating pulse from each of said tone output circuits for maintaining the associated tone output circuit operative for the duration of the associated control tone, and means responsive to said output signal for maintaining said last control tone circuit operative for the duration of the last control tone.

References Cited

UNITED STATES PATENTS

| | | | |
|---|---|---|---|
| 2,602,885 | 7/1952 | Armstrong | 325—392 XR |
| 2,980,794 | 4/1961 | Hargreaves | 325—392 XR |
| 2,985,755 | 5/1961 | Giesselman | 325—392 XR |
| 3,119,982 | 1/1964 | Willeme | 179—84.55 XR |
| 3,341,815 | 9/1967 | Axe | 340—171 |

ROBERT L. GRIFFIN, Primary Examiner

R. S. BELL, Assistant Examiner

U.S. Cl. X.R.

325—55, 392; 340—171